US008671052B1

(12) United States Patent
Palumbo et al.

(10) Patent No.: US 8,671,052 B1
(45) Date of Patent: Mar. 11, 2014

(54) METHOD AND SYSTEM FOR PRICING FORWARD COMMITMENTS FOR MORTGAGE LOANS AND FOR BUYING COMMITTED LOANS

(75) Inventors: Donald R. Palumbo, Ashburn, VA (US); Leslie D. Holmes, Reston, VA (US)

(73) Assignee: Fannie Mae, Washington, DC (US)

( * ) Notice: Subject to any disclaimer, the term of this patent is extended or adjusted under 35 U.S.C. 154(b) by 0 days.

(21) Appl. No.: 13/620,451

(22) Filed: Sep. 14, 2012

Related U.S. Application Data

(62) Division of application No. 10/748,791, filed on Dec. 30, 2003.

(60) Provisional application No. 60/437,084, filed on Dec. 30, 2002.

(51) Int. Cl.
| | |
|---|---|
| *G06Q 40/02* | (2012.01) |
| *G06Q 40/08* | (2012.01) |
| *G06Q 40/00* | (2012.01) |
| *G06Q 30/02* | (2012.01) |
| *G06Q 30/06* | (2012.01) |
| *G06Q 20/04* | (2012.01) |
| *G06Q 20/10* | (2012.01) |

(52) U.S. Cl.
CPC ............... *G06Q 40/02* (2013.01); *G06Q 40/08* (2013.01); *G06Q 30/02* (2013.01); *G06Q 30/06* (2013.01); *G06Q 20/10* (2013.01); *G06Q 20/04* (2013.01)
USPC .................................. 705/38; 705/39; 705/45

(58) Field of Classification Search
CPC ....... G06Q 30/02; G06Q 30/06; G06Q 40/02; G06Q 40/08; G06Q 20/10; G06Q 20/04
USPC ................................................. 705/38, 39, 45
See application file for complete search history.

(56) References Cited

U.S. PATENT DOCUMENTS

| | | | |
|---|---|---|---|
| 3,316,395 | A | 4/1967 | Lavin |
| 4,876,648 | A | 10/1989 | Lloyd |
| 5,239,462 | A | 8/1993 | Jones et al. |
| 5,262,941 | A | 11/1993 | Saladin et al. |

(Continued)

FOREIGN PATENT DOCUMENTS

| | | | |
|---|---|---|---|
| JP | 04-182868 A | | 6/1992 |
| JP | 2002-007701 A | | 1/2002 |

(Continued)

OTHER PUBLICATIONS

Business Wire; First Mutual Bancshares Reports 35th Consecutive Quarter of Record Profits; Jul. 24, 2001; pp. 1-14.*

(Continued)

*Primary Examiner* — Ella Colbert
(74) *Attorney, Agent, or Firm* — Foley & Lardner LLP

(57) ABSTRACT

A method for managing best efforts forward commitments for loans to be sold by a lender, where each loan has loan level data and the best efforts forward commitments have commitment data includes determining a price for the best efforts commitment based on at least the loan level data and tracking the loan level data for each loan. Upon identifying a change to the loan level data, the loan level data and the commitment data including the price is updated based on the change.

9 Claims, 17 Drawing Sheets

(56) References Cited

U.S. PATENT DOCUMENTS

| | | | |
|---|---|---|---|
| 5,274,547 A | 12/1993 | Zoffel et al. | |
| 5,323,315 A | 6/1994 | Highbloom | |
| 5,361,201 A | 11/1994 | Jost et al. | |
| 5,414,621 A | 5/1995 | Hough | |
| 5,537,315 A | 7/1996 | Mitcham | |
| 5,563,783 A | 10/1996 | Stolfo et al. | |
| 5,611,052 A | 3/1997 | Dykstra et al. | |
| 5,615,268 A | 3/1997 | Bisbee et al. | |
| 5,689,649 A | 11/1997 | Altman et al. | |
| 5,696,907 A | 12/1997 | Tom | |
| 5,699,527 A | 12/1997 | Davidson | |
| 5,732,400 A | 3/1998 | Mandler et al. | |
| 5,765,144 A | 6/1998 | Larche et al. | |
| 5,797,133 A | 8/1998 | Jones et al. | |
| 5,870,721 A | 2/1999 | Norris | |
| 5,878,403 A | 3/1999 | DeFrancesco et al. | |
| 5,878,404 A | 3/1999 | Stout et al. | |
| 5,930,775 A | 7/1999 | McCauley et al. | |
| 5,930,776 A | 7/1999 | Dykstra et al. | |
| 5,940,811 A | 8/1999 | Norris | |
| 5,940,812 A | 8/1999 | Tengel et al. | |
| 5,966,699 A * | 10/1999 | Zandi | 705/38 |
| 5,966,700 A | 10/1999 | Gould et al. | |
| 5,970,464 A | 10/1999 | Apte et al. | |
| 5,974,372 A | 10/1999 | Barnes et al. | |
| 5,983,206 A | 11/1999 | Oppenheimer | |
| 5,995,947 A | 11/1999 | Fraser et al. | |
| 6,014,645 A | 1/2000 | Cunningham | |
| 6,021,202 A | 2/2000 | Anderson et al. | |
| 6,029,149 A | 2/2000 | Dykstra et al. | |
| 6,035,288 A | 3/2000 | Solomon | |
| 6,044,362 A | 3/2000 | Neely | |
| 6,070,151 A | 5/2000 | Frankel | |
| 6,076,070 A | 6/2000 | Stack | |
| 6,088,686 A | 7/2000 | Walker et al. | |
| 6,105,007 A | 8/2000 | Norris | |
| 6,112,190 A | 8/2000 | Fletcher et al. | |
| 6,119,103 A | 9/2000 | Basch et al. | |
| 6,125,349 A | 9/2000 | Maher | |
| 6,144,948 A | 11/2000 | Walker et al. | |
| 6,202,053 B1 | 3/2001 | Christiansen et al. | |
| 6,226,624 B1 | 5/2001 | Watson et al. | |
| 6,233,566 B1 | 5/2001 | Levine et al. | |
| 6,289,319 B1 | 9/2001 | Lockwood | |
| 6,311,169 B2 | 10/2001 | Duhon | |
| 6,324,526 B1 | 11/2001 | D'Agostino | |
| 6,366,892 B1 | 4/2002 | Altman et al. | |
| 6,367,013 B1 | 4/2002 | Bisbee et al. | |
| 6,385,594 B1 * | 5/2002 | Lebda et al. | 705/38 |
| 6,401,070 B1 | 6/2002 | McManus et al. | |
| 6,405,181 B2 | 6/2002 | Lent et al. | |
| 6,430,539 B1 | 8/2002 | Lazarus et al. | |
| 6,438,526 B1 | 8/2002 | Dykes et al. | |
| 6,505,176 B2 | 1/2003 | DeFrancesco, Jr. et al. | |
| 6,513,018 B1 | 1/2003 | Culhane | |
| 6,532,450 B1 | 3/2003 | Brown et al. | |
| 6,584,467 B1 | 6/2003 | Haught et al. | |
| 6,594,635 B1 | 7/2003 | Erlanger | |
| 6,609,109 B1 | 8/2003 | Bradley et al. | |
| 6,611,816 B2 | 8/2003 | Lebda et al. | |
| 6,651,884 B2 | 11/2003 | Prendergast et al. | |
| 6,671,673 B1 | 12/2003 | Baseman et al. | |
| 6,823,319 B1 | 11/2004 | Lynch et al. | |
| 6,988,082 B1 * | 1/2006 | Williams et al. | 705/36 T |
| 7,085,735 B1 * | 8/2006 | Hall et al. | 705/4 |
| 7,146,337 B1 * | 12/2006 | Ward et al. | 705/38 |
| 7,337,136 B1 | 2/2008 | Burns et al. | |
| 2001/0029482 A1 | 10/2001 | Tealdi et al. | |
| 2001/0032178 A1 | 10/2001 | Adams et al. | |
| 2001/0037287 A1 * | 11/2001 | Broadbent et al. | 705/38 |
| 2002/0016758 A1 * | 2/2002 | Grigsby | 705/36 |
| 2002/0029154 A1 | 3/2002 | Majoor | |
| 2002/0029194 A1 | 3/2002 | Lewis et al. | |
| 2002/0032635 A1 | 3/2002 | Harris et al. | |
| 2002/0035520 A1 | 3/2002 | Weiss | |
| 2002/0038318 A1 | 3/2002 | Cochran et al. | |
| 2002/0040339 A1 | 4/2002 | Dhar et al. | |
| 2002/0042770 A1 | 4/2002 | Slyke et al. | |
| 2002/0052815 A1 | 5/2002 | Johnson et al. | |
| 2002/0052835 A1 | 5/2002 | Toscano | |
| 2002/0059137 A1 * | 5/2002 | Freeman et al. | 705/38 |
| 2002/0077968 A1 | 6/2002 | Kaniwa et al. | |
| 2002/0082984 A1 * | 6/2002 | Zappier | 705/38 |
| 2002/0087364 A1 | 7/2002 | Lerner et al. | |
| 2002/0087389 A1 | 7/2002 | Sklarz et al. | |
| 2002/0091550 A1 | 7/2002 | White et al. | |
| 2002/0091630 A1 | 7/2002 | Inoue | |
| 2002/0099650 A1 | 7/2002 | Cole | |
| 2002/0111835 A1 | 8/2002 | Hele et al. | |
| 2002/0111901 A1 | 8/2002 | Whitney | |
| 2002/0123960 A1 | 9/2002 | Ericksen | |
| 2002/0138414 A1 | 9/2002 | Baker | |
| 2002/0152155 A1 | 10/2002 | Greenwood et al. | |
| 2002/0152165 A1 | 10/2002 | Dutta et al. | |
| 2002/0152170 A1 | 10/2002 | Dutta et al. | |
| 2003/0023610 A1 | 1/2003 | Bove et al. | |
| 2003/0028478 A1 | 2/2003 | Kinney et al. | |
| 2003/0033241 A1 * | 2/2003 | Harari | 705/38 |
| 2003/0033242 A1 | 2/2003 | Lynch et al. | |
| 2003/0036994 A1 | 2/2003 | Witzig et al. | |
| 2003/0036995 A1 | 2/2003 | Lazerson | |
| 2003/0036996 A1 | 2/2003 | Lazerson | |
| 2003/0046223 A1 | 3/2003 | Crawford et al. | |
| 2003/0065614 A1 | 4/2003 | Sweeney | |
| 2003/0093366 A1 | 5/2003 | Halper et al. | |
| 2003/0110249 A1 | 6/2003 | Buus et al. | |
| 2003/0144949 A1 | 7/2003 | Blanch | |
| 2003/0167191 A1 | 9/2003 | Slabonik et al. | |
| 2003/0172025 A1 | 9/2003 | Gallina | |
| 2003/0177032 A1 | 9/2003 | Bonissone et al. | |
| 2003/0182159 A1 | 9/2003 | Bonissone et al. | |
| 2003/0187696 A1 | 10/2003 | Bonissone et al. | |
| 2003/0187697 A1 | 10/2003 | Bonissone et al. | |
| 2003/0187698 A1 | 10/2003 | Bonissone et al. | |
| 2003/0187699 A1 | 10/2003 | Bonissone et al. | |
| 2003/0187700 A1 | 10/2003 | Bonissone et al. | |
| 2003/0187701 A1 | 10/2003 | Bonissone et al. | |
| 2003/0187702 A1 | 10/2003 | Bonissone et al. | |
| 2003/0208385 A1 | 11/2003 | Zander et al. | |
| 2003/0212654 A1 | 11/2003 | Harper et al. | |
| 2003/0217034 A1 | 11/2003 | Shutt | |
| 2003/0220879 A1 | 11/2003 | Gaughan et al. | |
| 2003/0225662 A1 | 12/2003 | Horan et al. | |
| 2003/0229553 A1 | 12/2003 | Kongyingyong et al. | |
| 2003/0229581 A1 | 12/2003 | Green et al. | |
| 2003/0233260 A1 | 12/2003 | Snell et al. | |
| 2003/0233316 A1 | 12/2003 | Hu et al. | |
| 2004/0002915 A1 | 1/2004 | McDonald | |
| 2004/0019517 A1 | 1/2004 | Sennott | |
| 2004/0030616 A1 | 2/2004 | Florance et al. | |
| 2004/0030649 A1 | 2/2004 | Nelson et al. | |
| 2004/0034592 A1 | 2/2004 | Hu et al. | |
| 2004/0049439 A1 | 3/2004 | Johnston et al. | |
| 2004/0049445 A1 | 3/2004 | Kishore | |
| 2004/0059653 A1 | 3/2004 | Verkuylen et al. | |
| 2004/0064402 A1 | 4/2004 | Dreyer et al. | |
| 2004/0107161 A1 | 6/2004 | Tanaka et al. | |
| 2004/0122717 A1 | 6/2004 | Hancock | |

FOREIGN PATENT DOCUMENTS

| | | |
|---|---|---|
| JP | 2002-259696 A | 9/2002 |
| JP | 2002-288426 A | 10/2002 |
| JP | 2003-223559 A | 8/2003 |
| WO | WO-99/48036 A1 | 9/1999 |
| WO | WO-00/62209 A1 | 10/2000 |
| WO | WO-00/75833 A2 | 12/2000 |
| WO | WO-01/16845 A1 | 3/2001 |
| WO | WO-01/18718 A1 | 3/2001 |
| WO | WO-01/27832 A1 | 4/2001 |
| WO | WO-01/33461 A1 | 5/2001 |
| WO | WO-01/39079 A1 | 5/2001 |
| WO | WO-01/50318 A2 | 7/2001 |
| WO | WO-01/63445 A2 | 8/2001 |

(56) References Cited

FOREIGN PATENT DOCUMENTS

| WO | WO-01/63446 | 8/2001 |
|---|---|---|
| WO | WO-01/63534 A2 | 8/2001 |
| WO | WO-01/80123 A1 | 10/2001 |
| WO | WO-01/98999 A2 | 12/2001 |
| WO | WO-02/06989 | 1/2002 |
| WO | WO-02/08855 A2 | 1/2002 |
| WO | WO-02/23443 A1 | 3/2002 |
| WO | WO-02/084925 | 10/2002 |
| WO | WO-02/093286 | 11/2002 |
| WO | WO-03/009152 A1 | 1/2003 |
| WO | WO-03/071380 | 8/2003 |
| WO | WO-03/071388 | 8/2003 |

OTHER PUBLICATIONS

Business Wire; "Utah Based Online Wholesale Lender Network Announces Exclusive Agreement to Provide Lender Network"; Feb. 16, 1999; pp. 1-2.*
American Banker: "In Brief: Fannie Mae Releases Upgraded Software"; Apr. 25, 1997; p. 1.*
Mortgage-Backed Securities Letter; "Fannie Mae Launches Early Rate Lock Program"; Feb. 17, 1997; p. 1.*
Breakthroughs in Mortgage Banking: Looking Toward the Future, Real Estate Finance Press, Mortgage Bankers Association of America, 1996, pp. 5-1-5-8, ISBN 1-57599-016-4, Jess Lederman, Editor.
Edocs, "edocs Teams with Fannie Mae to Offer Lenders Online Account Management Solution," Press Release, Mar. 12, 2001, edocs, Inc., USA, 2 pages.
Fannie Mae, "Secondary Marketing: Cash", 1997, Fannie Mae, USA, 81 pages.
Fannie Mae, "Delivering Loans for MBS", 1996, Fannie Mae, Washington, DC, USA, 137 pages.
Fannie Mae, "Fannie Mae and First American Financial to Provide Lenders with Electronic Access to More Products on MORNETPlus Network; Appraisals, Flood Certificates, and Title Insurance in Offering," Press Release, Dec. 21, 1999, Fannie Mae, Washington, DC, USA, 2 pages.
Fannie Mae, "Fannie Mae Unveils MORNETPlus on the Web; Lenders Can Now Access Automated Underwriting and Other Mortgage Transaction Services on Fanniemae.com," Press Release, Mar. 23, 2000, Fannie Mae, Washington, DC, USA, 2 pages.
Fannie Mae, "General Servicing Fundamentals", 1996, Fannie Mae, Washington, DC, USA, 174 pages.
Fannie Mae, "Guide to Underwriting with Desktop Underwriter", Oct. 1997, Verison 4.0, Fannie Mae, Washington, DC, USA, 152 pages.
Fannie Mae, "Investor Accounting: Cash", 1996, Fannie Mae, Washington, DC, USA, 132 pages.
Fannie Mae, "Making Good Delivery a Guide to Delivering Loans for Cash and MBS", 1994, Fannie Mae, Washington, DC, USA, 121 pages.
Fannie Mae, "MORNET Cash Delivery System User's Guide", Nov. 1997, Version 2.6, Fannie Mae, Washington, DC, USA, 177 pages.
Fannie Mae, "MORNET MBS Pool Submission System User 19s Guide", Sep. 1998, Version 5.3, Fannie Mae, Washington, DC, USA, 256 pages.
Fannie Mae, "MORNET Servicing Support System User's Guide", Dec. 1998, Fannie Mae, Washington, DC, USA, 370 pages.
Fannie Mae, "Selling", 1995-2002 et al., Fannie Mae, Washington, DC, USA., 1119 pages.
Fannie Mae, "Servicing Guide", 1995-2002 et al., Forward, Table of Contents, Sections III, IX, X, and XI, Fannie Mae, Washington, DC, USA, 318 pages.
Fannie Mae, "Guide to Underwriting with Desktop Underwriter®," Sep. 2002, 212 pgs.
Final Office Action on U.S. Appl. No. 10/748,791, mail date Apr. 28, 2009, 12 pages.
Final Office Action on US Application, mail date May 6, 2010, 11 pages.
Laser Overview, May 1993, chapters 1-18.
Non-Final Office Action on U.S. Appl. No. 10/748,791, mail date May 29, 2008, 12 pages.
Non-Final Office Action on U.S. Appl. No. 10/748,791, mail date Oct. 15, 2009, 11 pages.
Object Management Group, "Fannie Mae", CORBA Banking/Finance, Sep. 17, 2001, Object Management Group, Needham, MA, USA, 2 pages.
Raines Franklin D., "Speech by Franklin D. Raines Chairman and CEO of Fannie Mae, Fannie Mae and the Mortgage Industry in the E-Commerce Age," May 8, 2000, Fannie Mae, USA, 20 pgs.
Smith Tom "Fannie Mae Ramps up Web Apps: Q&A with Julie St. John Executive Vice President and Chief Technology Office and Michael Williams President of Fannie Mae e-Business" Internetweek.com, USA, Undated, 11 pgs.
Smith Tom, "E-Commerce Holds Keys to Home Ownership: Fannie Mae drives hug volumes of mortgage business to its e-marketplace," Internetweek.com, USA, Undated, 5 pgs.
Sun, "Success on Sun: Software Development Case Study Federal National Mortgage Association (Fannie Mae)," Mar. 1995, Sun, USA, 10 pages.
Williams Michael, "Technology and Other Keys to the Boom in Refinancing," American Banker, Apr. 20, 2003, vol. 168, Issue 63, p. 8., American Banker USA, 3 pages.
Mortgage Marketplace: "In a Nutshell"; Feb. 17, 1997, p. 1. vol. 10, Issue 7, American Banker Publications. 1 page.
Notice of Allowance on U.S. Appl. No. 10/748,791, mail date Oct. 21, 2013, 11 pages.

* cited by examiner

EXTENSION – NEED EXTENSION

[ AUTO EXTENSION ] [ NEED EXTENSION ] [ UPCOMING EXPIRATIONS ]

| EXCL | CASEFILE | LENDER LOAN NBR | EFFECTIVE | LOCK EXPIRATION | SCHEDULED CLOSING | PRODUCT | RATE/POINTS | AMOUNT | COMMITMENT EFFECTIVE | EXPIRATION | PNY/PRICE | |
|---|---|---|---|---|---|---|---|---|---|---|---|---|
| ☐ | XXXXXXX | XXXXXXX | XX/XX/XX | XX/XX/XX | XX/XX/XX | 15 YR FIXED | 0.000% | 999,999 | XX/XX/XX | XX/XX/XX | 0.000% | 100,000,000 |
| ☐ | XXXXXXX | XXXXXXX | XX/XX/XX | XX/XX/XX | XX/XX/XX | 15 YR FIXED | 0.000% | 999,999 | XX/XX/XX | XX/XX/XX | 0.000% | 100,000,000 |
| ☐ | XXXXXXX | XXXXXXX | XX/XX/XX | XX/XX/XX | XX/XX/XX | 15 YR FIXED | 0.000% | 999,999 | XX/XX/XX | XX/XX/XX | 0.000% | 100,000,000 |
| TOTAL 15 YEAR FIXED | | | | | | | | 999,999 | | | | |
| ☐ | XXXXXXX | XXXXXXX | XX/XX/XX | XX/XX/XX | XX/XX/XX | 30 YR FIXED | 0.000% | 999,999 | XX/XX/XX | XX/XX/XX | 0.000% | 100,000,000 |
| ☐ | XXXXXXX | XXXXXXX | XX/XX/XX | XX/XX/XX | XX/XX/XX | 30 YR FIXED | 0.000% | 999,999 | XX/XX/XX | XX/XX/XX | 0.000% | 100,000,000 |
| ☐ | XXXXXXX | XXXXXXX | XX/XX/XX | XX/XX/XX | XX/XX/XX | 30 YR FIXED | 0.000% | 999,999 | XX/XX/XX | XX/XX/XX | 0.000% | 100,000,000 |
| ☐ | XXXXXXX | XXXXXXX | XX/XX/XX | XX/XX/XX | XX/XX/XX | 30 YR FIXED | 0.000% | 999,999 | XX/XX/XX | XX/XX/XX | 0.000% | 100,000,000 |
| ☐ | XXXXXXX | XXXXXXX | XX/XX/XX | XX/XX/XX | XX/XX/XX | 30 YR FIXED | 0.000% | 999,999 | XX/XX/XX | XX/XX/XX | 0.000% | 100,000,000 |
| ☐ | XXXXXXX | XXXXXXX | XX/XX/XX | XX/XX/XX | XX/XX/XX | 30 YR FIXED | 0.000% | 999,999 | XX/XX/XX | XX/XX/XX | 0.000% | 100,000,000 |
| TOTAL 30 YEAR FIXED | | | | | | | | 999,999 | | | | |

[ EXTEND COMMITMENT ]

DISPLAY MESSAGE – PC-007 (SEE SECTION 11 – LENDER MESSAGES)

EXTENSION – UPCOMING EXPIRATIONS

[ AUTO EXTENSION ] [ NEED EXTENSION ] [ UPCOMING EXPIRATIONS ] — 716

| CASEFILE | LENDER LOAN NBR | EFFECTIVE | EXPIRATION | SCHEDULED CLOSING | PRODUCT | RATE/POINTS | AMOUNT | EFFECTIVE | EXPIRATION | PNY/PRICE |
|---|---|---|---|---|---|---|---|---|---|---|
| | | | LOCK | | | | | | COMMITMENT — 718 | |
| XXXXXX | XXXXXXX | XX/XX/XX | XX/XX/XX | XX/XX/XX | 30 YR FIXED | 0.000% | 999,999 | XX/XX/XX | XX/XX/XX | 0.000% 100,000,000 |
| XXXXXX | XXXXXXX | XX/XX/XX | XX/XX/XX | XX/XX/XX | 30 YR FIXED | 0.000% | 999,999 | XX/XX/XX | XX/XX/XX | 0.000% 100,000,000 |
| XXXXXX | XXXXXXX | XX/XX/XX | XX/XX/XX | XX/XX/XX | 15 YR FIXED | 0.000% | 999,999 | XX/XX/XX | XX/XX/XX | 0.000% 100,000,000 |
| TOTAL EXPIRATIONS TODAY | | | | | | | 999,999 | | | |
| XXXXXX | XXXXXXX | XX/XX/XX | XX/XX/XX | XX/XX/XX | 30 YR FIXED | 0.000% | 999,999 | XX/XX/XX | XX/XX/XX | 0.000% 100,000,000 |
| XXXXXX | XXXXXXX | XX/XX/XX | XX/XX/XX | XX/XX/XX | 15 YR FIXED | 0.000% | 999,999 | XX/XX/XX | XX/XX/XX | 0.000% 100,000,000 |
| XXXXXX | XXXXXXX | XX/XX/XX | XX/XX/XX | XX/XX/XX | 30 YR FIXED | 0.000% | 999,999 | XX/XX/XX | XX/XX/XX | 0.000% 100,000,000 |
| XXXXXX | XXXXXXX | XX/XX/XX | XX/XX/XX | XX/XX/XX | 30 YR FIXED | 0.000% | 999,999 | XX/XX/XX | XX/XX/XX | 0.000% 100,000,000 |
| XXXXXX | XXXXXXX | XX/XX/XX | XX/XX/XX | XX/XX/XX | 15 YR FIXED | 0.000% | 999,999 | XX/XX/XX | XX/XX/XX | 0.000% 100,000,000 |
| XXXXXX | XXXXXXX | XX/XX/XX | XX/XX/XX | XX/XX/XX | 30 YR FIXED | 0.000% | 999,999 | XX/XX/XX | XX/XX/XX | 0.000% 100,000,000 |
| XXXXXX | XXXXXXX | XX/XX/XX | XX/XX/XX | XX/XX/XX | 30 YR FIXED | 0.000% | 999,999 | XX/XX/XX | XX/XX/XX | 0.000% 100,000,000 |
| TOTAL EXPIRING IN 1 BUSINESS DAY | | | | | | | 999,999 | | | |

- DISPLAY MESSAGE – PC-008 (SEE SECTION 11 – LENDER MESSAGES)
- SORT AND GROUP – NEAREST TO FARTHEST EXPIRATION DATA (ASCENDING ORDER)

FIG. 7c

ELIGIBLE PRODUCT CHANGE

[AUTO CHANGED] [AUTO CANCELED] [ELIGIBLE PROD. CHG.] [INELIGIBLE PROD. CHG.]

| | | | LOCK | | | | | | CURRENT COMMITMENT | | | NEW COMMITMENT | |
|---|---|---|---|---|---|---|---|---|---|---|---|---|---|
| EXCL | CASEFILE | LENDER LOAN NBR | EFF | PRODUCT | RATE | AMOUNT | EFF | EXP | PRODUCT | PNY/PRICE | | PRODUCT | PNY/PRICE |
| ☐ | XXXXXXX | XXXXXXX | XX/XX/XX | 15 YR FIXED | 0.000% | 999,999 | XX/XX/XX | XX/XX/XX | 30 YR FIXED | 0.000% | 100,000,000 | 15 YR FIXED | 0.000% 100,000,000 |
| ☐ | XXXXXXX | XXXXXXX | XX/XX/XX | 15 YR FIXED | 0.000% | 999,999 | XX/XX/XX | XX/XX/XX | 30 YR FIXED | 0.000% | 100,000,000 | 15 YR FIXED | 0.000% 100,000,000 |
| ☐ | XXXXXXX | XXXXXXX | XX/XX/XX | 15 YR FIXED | 0.000% | 999,999 | XX/XX/XX | XX/XX/XX | 20 YR FIXED | 0.000% | 100,000,000 | 15 YR FIXED | 0.000% 100,000,000 |
| | | TOTAL 15 YEAR FIXED | | | | 999,999 | | | | | | | |
| ☐ | XXXXXXX | XXXXXXX | XX/XX/XX | 30 YR FIXED | 0.000% | 999,999 | XX/XX/XX | XX/XX/XX | 15 YR FIXED | 0.000% | 100,000,000 | 30 YR FIXED | 0.000% 100,000,000 |
| ☐ | XXXXXXX | XXXXXXX | XX/XX/XX | 30 YR FIXED | 0.000% | 999,999 | XX/XX/XX | XX/XX/XX | 15 YR FIXED | 0.000% | 100,000,000 | 30 YR FIXED | 0.000% 100,000,000 |
| ☐ | XXXXXXX | XXXXXXX | XX/XX/XX | 30 YR FIXED | 0.000% | 999,999 | XX/XX/XX | XX/XX/XX | 20 YR FIXED | 0.000% | 100,000,000 | 30 YR FIXED | 0.000% 100,000,000 |
| ☐ | XXXXXXX | XXXXXXX | XX/XX/XX | 30 YR FIXED | 0.000% | 999,999 | XX/XX/XX | XX/XX/XX | 15 YR FIXED | 0.000% | 100,000,000 | 30 YR FIXED | 0.000% 100,000,000 |
| ☐ | XXXXXXX | XXXXXXX | XX/XX/XX | 30 YR FIXED | 0.000% | 999,999 | XX/XX/XX | XX/XX/XX | 20 YR FIXED | 0.000% | 100,000,000 | 30 YR FIXED | 0.000% 100,000,000 |
| ☐ | XXXXXXX | XXXXXXX | XX/XX/XX | 30 YR FIXED | 0.000% | 999,999 | XX/XX/XX | XX/XX/XX | 28 YR FIXED | 0.000% | 100,000,000 | 30 YR FIXED | 0.000% 100,000,000 |
| ☐ | XXXXXXX | XXXXXXX | XX/XX/XX | 30 YR FIXED | 0.000% | 999,999 | XX/XX/XX | XX/XX/XX | 13 YR FIXED | 0.000% | 100,000,000 | 30 YR FIXED | 0.000% 100,000,000 |
| | | TOTAL 30 YEAR FIXED | | | | 999,999 | | | | | | | |

DISPLAY MESSAGE - PC-010 (SEE SECTION 11 - LENDER MESSAGES)

(PERFORM PRODUCT CHANGE)

FIG. 10a

PRODUCT CHANGE – AUTO CHANGED

| | AUTO-CHANGED | AUTO CANCELED | ELIGIBLE PROD. CHG. | INELIGIBLE PROD. CHG. | | | | | | | | | |
|---|---|---|---|---|---|---|---|---|---|---|---|---|---|
| | LENDER | | LOCK | | | | | CURRENT COMMITMENT | | | OLD COMMITMENT | | |
| CASEFILE | LOAN NBR | EFF | EFF | PRODUCT | RATE | AMOUNT | EFF | EXP | PRODUCT | PNY/PRICE | PRODUCT | PNY/PRICE |
| XXXXXXX | XXXXXXX | XX/XX/XX | XX/XX/XX | 15 YR FIXED | 0.000% | 999,999 | XX/XX/XX | XX/XX/XX | 15 YR FIXED | 0.000% 100,000,000 | 30 YR FIXED | 0.000% 100,000,000 |
| XXXXXXX | XXXXXXX | XX/XX/XX | XX/XX/XX | 15 YR FIXED | 0.000% | 999,999 | XX/XX/XX | XX/XX/XX | 15 YR FIXED | 0.000% 100,000,000 | 30 YR FIXED | 0.000% 100,000,000 |
| XXXXXXX | XXXXXXX | XX/XX/XX | XX/XX/XX | 15 YR FIXED | 0.000% | 999,999 | XX/XX/XX | XX/XX/XX | 15 YR FIXED | 0.000% 100,000,000 | 20 YR FIXED | 0.000% 100,000,000 |
| TOTAL 15 YEAR FIXED | | | | | | 999,999 | | | | | | |
| XXXXXXX | XXXXXXX | XX/XX/XX | XX/XX/XX | 30 YR FIXED | 0.000% | 999,999 | XX/XX/XX | XX/XX/XX | 30 YR FIXED | 0.000% 100,000,000 | 15 YR FIXED | 0.000% 100,000,000 |
| XXXXXXX | XXXXXXX | XX/XX/XX | XX/XX/XX | 30 YR FIXED | 0.000% | 999,999 | XX/XX/XX | XX/XX/XX | 30 YR FIXED | 0.000% 100,000,000 | 15 YR FIXED | 0.000% 100,000,000 |
| XXXXXXX | XXXXXXX | XX/XX/XX | XX/XX/XX | 30 YR FIXED | 0.000% | 999,999 | XX/XX/XX | XX/XX/XX | 30 YR FIXED | 0.000% 100,000,000 | 15 YR FIXED | 0.000% 100,000,000 |
| XXXXXXX | XXXXXXX | XX/XX/XX | XX/XX/XX | 30 YR FIXED | 0.000% | 999,999 | XX/XX/XX | XX/XX/XX | 30 YR FIXED | 0.000% 100,000,000 | 20 YR FIXED | 0.000% 100,000,000 |
| XXXXXXX | XXXXXXX | XX/XX/XX | XX/XX/XX | 30 YR FIXED | 0.000% | 999,999 | XX/XX/XX | XX/XX/XX | 30 YR FIXED | 0.000% 100,000,000 | 20 YR FIXED | 0.000% 100,000,000 |
| XXXXXXX | XXXXXXX | XX/XX/XX | XX/XX/XX | 30 YR FIXED | 0.000% | 999,999 | XX/XX/XX | XX/XX/XX | 30 YR FIXED | 0.000% 100,000,000 | 15 YR FIXED | 0.000% 100,000,000 |
| XXXXXXX | XXXXXXX | XX/XX/XX | XX/XX/XX | 30 YR FIXED | 0.000% | 999,999 | XX/XX/XX | XX/XX/XX | 30 YR FIXED | 0.000% 100,000,000 | 20 YR FIXED | 0.000% 100,000,000 |
| TOTAL 30 YEAR FIXED | | | | | | 999,999 | | | | | | |

ACKNOWLEDGE — 1018

- DISPLAY MESSAGE – PC-009 (SEE SECTION 11 – LENDER MESSAGES)
- SORT BY CHANGE DATE WITH OLDEST AT TOP, MOST RECENT AT BOTTOM

AUTO CANCELED

| | | | | LOCK | | | | CURRENT COMMITMENT | | | |
|---|---|---|---|---|---|---|---|---|---|---|---|
| CASEFILE | LENDER LOAN NBR | EFFECTIVE | EXPIRATION | PRODUCT | RATE | AMOUNT | EFF | EXP | PRODUCT | | PNY/PRICE |
| XXXXXXX | XXXXXXX | XX/XX/XX | XX/XX/XX | 5/1 ARM | 0.000% | 999,999 | XX/XX/XX | XX/XX/XX | 15 YR FIXED | 0.000% | 100,000,000 |
| XXXXXXX | XXXXXXX | XX/XX/XX | XX/XX/XX | 5/1 ARM | 0.000% | 999,999 | XX/XX/XX | XX/XX/XX | 30 YR FIXED | 0.000% | 100,000,000 |
| XXXXXXX | XXXXXXX | XX/XX/XX | XX/XX/XX | 5/1 ARM | 0.000% | 999,999 | XX/XX/XX | XX/XX/XX | 15 YR FIXED | 0.000% | 100,000,000 |
| TOTAL 5/1 ARM CANCELED | | | | | | 999,999 | | | | | |
| XXXXXXX | XXXXXXX | XX/XX/XX | XX/XX/XX | 10/1 ARM | 0.000% | 999,999 | XX/XX/XX | XX/XX/XX | 15 YR FIXED | 0.000% | 100,000,000 |
| XXXXXXX | XXXXXXX | XX/XX/XX | XX/XX/XX | 10/1 ARM | 0.000% | 999,999 | XX/XX/XX | XX/XX/XX | 15 YR FIXED | 0.000% | 100,000,000 |
| XXXXXXX | XXXXXXX | XX/XX/XX | XX/XX/XX | 10/1 ARM | 0.000% | 999,999 | XX/XX/XX | XX/XX/XX | 30 YR FIXED | 0.000% | 100,000,000 |
| XXXXXXX | XXXXXXX | XX/XX/XX | XX/XX/XX | 10/1 ARM | 0.000% | 999,999 | XX/XX/XX | XX/XX/XX | 15 YR FIXED | 0.000% | 100,000,000 |
| XXXXXXX | XXXXXXX | XX/XX/XX | XX/XX/XX | 10/1 ARM | 0.000% | 999,999 | XX/XX/XX | XX/XX/XX | 30 YR FIXED | 0.000% | 100,000,000 |
| XXXXXXX | XXXXXXX | XX/XX/XX | XX/XX/XX | 10/1 ARM | 0.000% | 999,999 | XX/XX/XX | XX/XX/XX | 30 YR FIXED | 0.000% | 100,000,000 |
| XXXXXXX | XXXXXXX | XX/XX/XX | XX/XX/XX | 10/1 ARM | 0.000% | 999,999 | XX/XX/XX | XX/XX/XX | 15 YR FIXED | 0.000% | 100,000,000 |
| TOTAL 10/1 ARM CANCELED | | | | | | 999,999 | | | | | |

[AUTO CHANGED] [AUTO CANCELED] [ELIGIBLE PROD. CHG.] [INELIGIBLE PROD. CHG.]

(ACKNOWLEDGE) ~1032

DISPLAY MESSAGE - PC-??? (SEE SECTION 11 - LENDER MESSAGES)

FIG. 10d

METHOD AND SYSTEM FOR PRICING FORWARD COMMITMENTS FOR MORTGAGE LOANS AND FOR BUYING COMMITTED LOANS

PRIORITY

This application is a divisional of co-pending U.S. application Ser. No. 10/748,791, filed on Dec. 30, 2003, which claims the benefit of U.S. Provisional Application 60/437,084, filed Dec. 30, 2002, both of which are hereby incorporated by reference in their entirety.

FIELD OF THE INVENTION

This invention relates generally to a computerized mortgage qualification, application, approval, underwriting, pricing and sale system and process. More particularly, the present invention relates to a method and system for managing and pricing best efforts type forward commitments for the sale of mortgage loans to the secondary mortgage market.

BACKGROUND OF THE INVENTION

The purchase of a home is typically the largest investment that a person makes. Because of the amount of money required to purchase a home, most home buyers do not have sufficient assets to purchase a home outright on a cash basis. In addition, buyers who have already purchased a home may wish to refinance their home. Refinancing refers to the process of paying off one loan with the proceeds from a new loan using the same property as security for the repayment obligation. For the homeowner, the purpose of refinancing is usually to obtain a lower interest rate and/or to obtain cash for other purposes by reducing equity in the home. Therefore, potential homebuyers consult lenders such as banks, credit unions, mortgage companies, savings and loan institutions, state and local housing finance agencies, and so on, to obtain the funds necessary to purchase or refinance their homes. These lenders offer mortgage products to potential home buyers. A mortgage commits the lender (mortgagee) to provide loan funds sufficient for the borrower (mortgagor) to purchase the home. In exchange for the loan funds, the borrower commits to repay the loan funds by way of a series of loan payments. If the borrower fails to repay the loan funds, the lender has a legal claim against the home which allows the lender to sell the property and use the proceeds to pay off the loan balance (foreclosure). The lenders who make (originate and fund) mortgage loans directly to home buyers comprise the "primary mortgage market."

When a mortgage is made in the primary mortgage market, the lender can: (i) hold the loan as an investment in its portfolio; or (ii) sell the loan to investors in the "secondary mortgage market" (e.g., pension funds, insurance companies, securities dealers, financial institutions and various other investors) to replenish its supply of funds. The loan may be sold alone, or in packages of other similar loans, for cash or in exchange for mortgage backed securities which provide lenders with a liquid asset to hold or sell to the secondary market. By choosing to sell its mortgage loans to the secondary mortgage market for cash, or by selling the mortgage backed securities, lenders get a new supply of funds to make more home mortgage loans, thereby assuring home buyers a continual supply of mortgage credit.

When a prospective borrower (or applicant, mortgagor) submits an application for a mortgage loan to a lender in the primary mortgage market the lender typically, at the borrower's election, will commit to hold (or lock) the interest rate for a period of time required to perform loan processing steps and close the loan. The lock guarantees that the interest rate will not increase during this period, but also restricts the interest rate from decreasing even if the secondary market interest rates decrease. Upon entering this lock agreement with the borrower, the lender becomes subject to price risk (i.e., the risk that secondary market interest rates will change) and volume risk (i.e., the risk that the locked loan will not result in a closed loan within the specified lock period).

To protect itself from interest rate fluctuation during the interim between when a borrower locks in and when the lender can sell the closed loan into the secondary market, a lender will enter into a hedge transaction. One such transaction is a forward commitment. A lender commits to sell a loan with a specified product and specified interest rate within a specified period to a secondary market purchaser. In exchange, the secondary market purchaser commits to pay the lender a specified price for the closed loan within a particular period of time.

In a forward commitment, the lender/seller locks in a price for the sale of the loan(s) at the time of commitment and has until the commitment expiration date to deliver the loan(s) to the purchaser. A forward commitment enables a lender/seller to reduce or eliminate interest rate risk. Without a forward commitment, if interest rates increase, the loan will be less valuable when sold into the secondary market. Conversely, if interest rates were to fall, the lender may benefit because a loan with a higher interest rate is more valuable when sold into the secondary market.

A forward commitment may be a cash commitment, i.e., an agreement in which the mortgage purchaser agrees to buy mortgages from mortgage sellers (e.g., lenders) in exchange for a specified price in cash. Typically, a cash commitment agreement specifies the type of mortgage(s) the seller plans to deliver, the unpaid balance of the loan(s) the seller plans to deliver, the amount of time the seller has to make delivery, the price the mortgage purchaser will pay the seller for the loan(s), and so on.

One type of forward commitment is a mandatory commitment. In a mandatory commitment, the lender/seller must deliver a committed unpaid balance of loan(s) by a designated delivery date. If the lender/seller does not deliver the committed unpaid balance, however, the lender/seller will incur a pair-off fee (for under deliveries) or an over-delivery fee. As such, mandatory commitments provide the lender/seller with protection against price risk but do not provide protection against volume risk.

Another type of forward commitment is a best efforts commitment. Best efforts commitments help lenders/sellers manage their price risk as well as the pair-off risk (or volume risk) by shifting the risk of pipeline fallout to the purchaser of the loan(s). Pipeline fallout occurs when a loan does not close within the specified time committed and therefore will not be available for sale to the investor. A best efforts commitment allows a lender/seller to get a price at commitment for a loan transaction and not be penalized or charged a fee if the loan does not close or "falls-out" of their pipeline. Only when a loan closes is the lender/seller required to deliver the loan to the purchaser.

As mentioned, a forward commitment typically involves a time delay between the commitment to sell the loan and the delivery date for the loan. During the time period between the commitment to sell the loan and the actual delivery of the loan, it is possible that changes may be made to the loan level data (e.g., loan characteristics) for the loan. Changes in loan level data may result from, for example, further negotiations between a borrower and a lender. A secondary mortgage market purchaser, however, may not become aware of the change until the loan is actually delivered by the lender. Certain changes to the loan level data may cause the secondary mortgage market purchaser to charge the lender a price adjustment for the sale of the loan or to reject the loan as being ineligible when the loan is delivered.

SUMMARY OF THE INVENTION

In accordance with one embodiment, a method for managing best efforts forward commitments for loans to be sold by a lender, the best efforts forward commitments having commitment data, where each loan has loan level data and is associated with a borrower includes tracking the loan level data for each loan, identifying a change made to the loan level data for at least one loan by the lender and updating the loan level data for the at least one loan and the commitment data based on the change.

In accordance with another embodiment, a system for loan acquisition by an investor includes data capture logic configured to receive loan level data for a loan from a lender, a storage device coupled to the data capture logic for storing at least the loan level data. The system further includes commitment logic configured to create a forward commitment for the sale of the loan based on a request received from the lender. The forward commitment has a set of commitment data. Pricing logic is coupled to the commitment logic and determines a price for the forward commitment based on at least the loan level data. The commitment logic is further configured to identify a change made to the loan level data and update the loan level data and the commitment data based on the change. The pricing logic is further configured to determine an updated price for the forward commitment based at least on the change to the loan level data.

In accordance with yet another embodiment, a system for managing best efforts forward commitments for loans to be sold by a lender, the best efforts forward commitments having commitment data where each loan has loan level data and is associated with a borrower includes means for determining a price for the best efforts commitment based on at least the loan level data, means for tracking the loan level data for each loan, means for identifying a change made to the loan level data by the lender and updating the loan level data and the commitment data including the price based on the change.

In accordance with yet another embodiment, a method of generating a best efforts commitment price for a plurality of loans includes acquiring loan level data for each loan in the plurality of loans, generating a value relating to pipeline fallout risk based on the loan level data, and determining the best efforts commitment price based on the value relating to pipeline fallout risk.

In accordance with a further embodiment, a method for managing the volume risk associated with a best efforts commitment includes acquiring loan level data for each loan in a plurality of loans from a loan origination system and generating a best efforts commitment price for the plurality of loans based on the loan level data.

In accordance with yet another embodiment, a method for managing interest rate and fall out risk associated with at leas tone loan purchased under a best efforts commitment from a lender includes acquiring loan level data for the at least one loan from a seller system, acquiring data regarding the fall out performance of a loan pipeline for the seller from the seller system and generating a coverage ratio value based on the loan level data for the at least one loan.

In accordance with a further embodiment, a system for buying loans from a lender under a forward commitment having commitment data where each loan has loan level data includes a lender interface configured to receive information including loan level data from the lender; and an investor facility coupled to the lender interface. The investor facility includes data capture logic configured to receive loan level data for a loan from the lender interface, commitment logic configured to create a forward commitment for the sale of the loan based on a request received from the lender, and pricing logic configured to determine a price for the forward commitment based on at least the loan level data. The commitment logic is further configured to identify a change made to the loan level data by the lender and to update the loan level data and the commitment data based on the change. The pricing logic is further configured to determine an updated price for the forward commitment based at least on the change to the loan level data.

BRIEF DESCRIPTION OF THE DRAWINGS

FIGS. 7a-7c are exemplary user interfaces for an extension process in accordance with an embodiment.

FIG. 10a-10d are exemplary user interfaces for a product change process in accordance with an embodiment.

DETAILED DESCRIPTION OF THE PREFERRED EMBODIMENTS

A system and process is provided that allows a lender/seller to make a best efforts commitment of a specific loan or loans (e.g., mortgage loans) to a purchaser in the secondary mortgage market and obtain a price for the best efforts commitment. The system and process also provides secondary mortgage market purchasers with the means to purchase loans (e.g., mortgage loans) based on a best efforts commitment, track changes made to committed loans by the lender/seller and make adjustments to the commitment (e.g., commitment expiration date and commitment price), and to price the best efforts commitment based at least on data regarding the loan and knowledge of the lender/seller's loan pipeline, for example, historical information regarding past performance of the lenders pipeline (i.e., the amount of "fallout" from the pipeline). Although discussed herein in the context of mortgage loans, it should be understood that the present invention is not limited to mortgage loans, but has application with respect to other types of loans, mortgage products and financial instruments or assets. Additionally, a variety of parties may use the systems and methods disclosed, including conventional lenders, other loan originators, loan servicers in the primary mortgage market, loan purchasers, etc.

Figure 1:
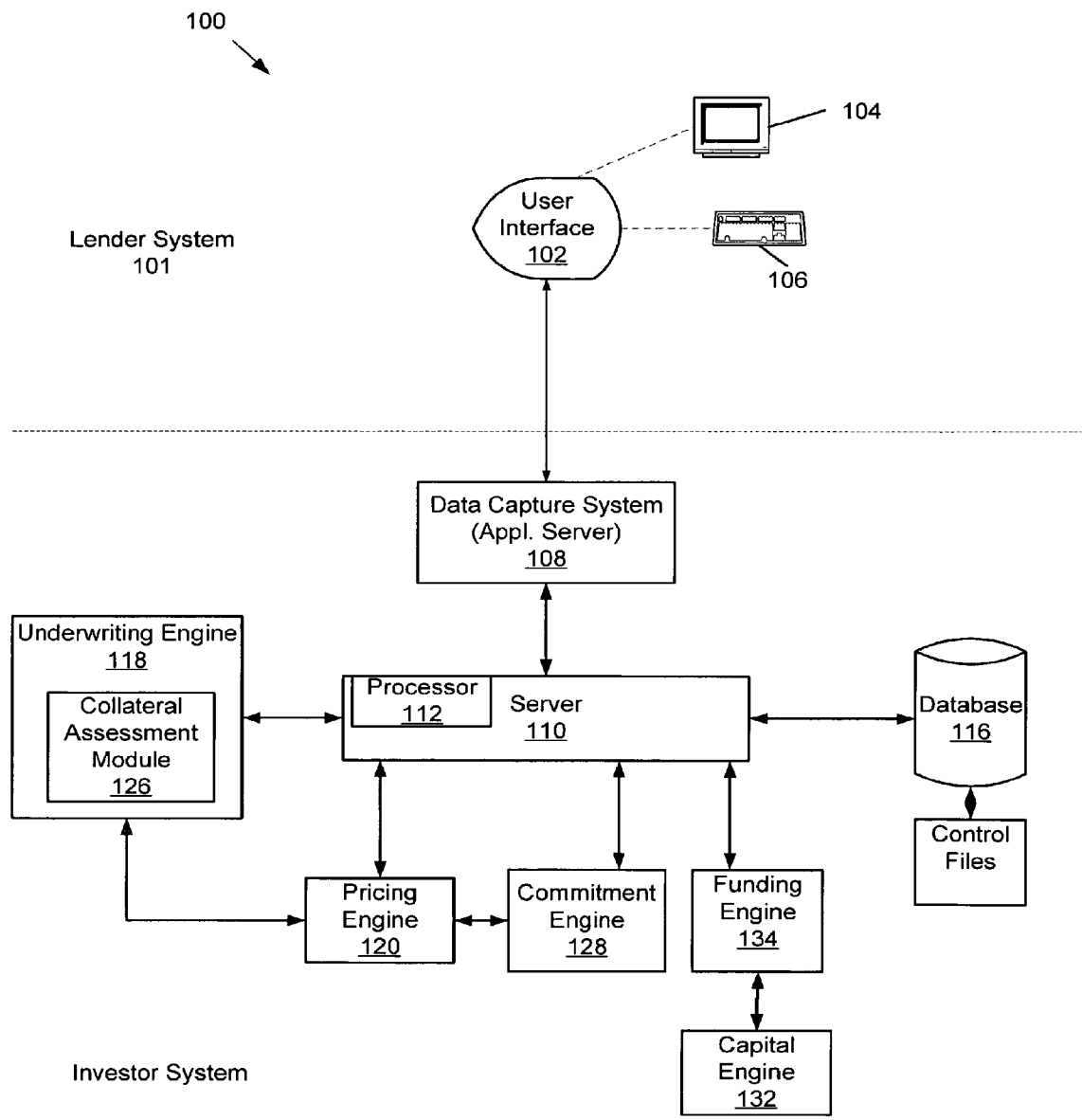
FIG. 1 is a schematic diagram of a system for managing and pricing forward commitments of mortgage loans in accordance with an embodiment.

FIG. 1 is a schematic diagram of a system for managing and pricing forward commitments of mortgage loans in accordance with an embodiment of the invention. Generally, the systems and methods disclosed facilitate the sale of mortgage loans to secondary market purchasers. In FIG. 1, system 100 preferably utilizes computer systems, both hardware and software, and electronic communication links, for example, to display loan information to a lender/seller or potential borrower and to receive and process, in real time, data input by the lender/seller or the potential borrower. In accordance with various embodiments, data may be received and displayed in real time over the Internet or other computer network. Various embodiments may be implemented in a variety of environments including a single computer system, intranets, local area networks, communication networks, dial-up services, etc.

System 100 includes a computer server 110 which includes a processor 112. Server 110 is preferably used by a participant in the secondary mortgage market. As used herein, the secondary mortgage market participant is referred to as a "purchaser," although it should be understood that the secondary mortgage market participant may have other roles in the secondary mortgage market such as a loan securitizer, a loan guarantor, etc. Server 110 has electronic access to a database 116. Processor 112 operates under the control of computer software to carry out the process steps described in greater detail hereinafter. The computer software includes a pricing engine 120, a funding engine 134, a commitment engine 128, a capital engine 132, an underwriting engine 118, and a collateral assessment module 126 within the underwriting engine 118, each a set of software objects and/or program elements collectively having the ability to execute independently in a separate thread or logical chain of process evaluation, while permitting the flow of data inputs therebetween. Engines 118, 120, 128, 132 and 134, and module 126 can each be executed as a separate logical server or using a separate physical device. However, for lenders and potential borrowers, server 110 preferably operates as a single logical server for this particular purpose. It should also be understood that capital engine 132 and funding engine 134 may be comprised of multiple systems performing various functions, e.g., a network of large-scale internal systems of an investor that manages these functions.

Server 110 is electronically coupled to a data capture system 108. Data capture system 108 may be, for example, a remote server. Data capture system 108 is coupled to a user interface 102 including conventional input and display devices 106 and 104 respectively. Interface 102 is preferably a remote interface on a lender side 101 of system 100 and is preferably coupled to data capture system 108 via a global computer network. A common example of such a network is the Internet.

Users of lender system 101 include potential borrowers (e.g., home borrowers) and loan originators, which may be mortgage companies, savings and loans or other lending institutions. Desirably, the loan originators also include prospects in the mortgage lending business. A potential borrower may access the lender system 101 via, for example, the lender's web site which may be used to display information for the potential borrower or receive data from the potential borrower (e.g., by clicking on appropriate links on the lender's web site). Alternatively, information may be received from a borrower via an input device 106 used by an employee of the lender if, for example, the borrower is supplying information to the employee of the lender during an in person meeting or over the telephone.

System 100 performs numerous functions, including but not limited to: (i) identifying available loan products to potential borrowers, (ii) evaluating a loan application, and (iii) facilitating the sale of a mortgage loan to the secondary mortgage market purchaser. The loan product identification function involves (a) calculating sample interest rates for presentation to potential borrowers at step 200, and (b) assessing a potential borrower's likelihood of being approved for a loan. The loan application evaluation function of system 100 involves underwriting the loan and generating an interest rate/point combination for the loan based on the potential borrower's specific financial profile and other relevant characteristics. The function of facilitating the sale of the mortgage loan to the secondary mortgage market involves committing or selling the individual loan to a secondary mortgage market participant in the secondary mortgage market.

Although functionally distinct, it should be understood that the functions of system 100, such as those described above, preferably overlap when it comes to the flow of data inputs through system 100 in order to avoid requiring the borrower to enter the same data more than once. For example, information input by the potential borrower and/or lender/seller and used by underwriting engine 118 can be used to populate the loan application and can be used by pricing engine 120, commitment engine 128, funding engine 134 and collateral assessment module 126 to effect their respective functions within system 100.

Figure 2A:
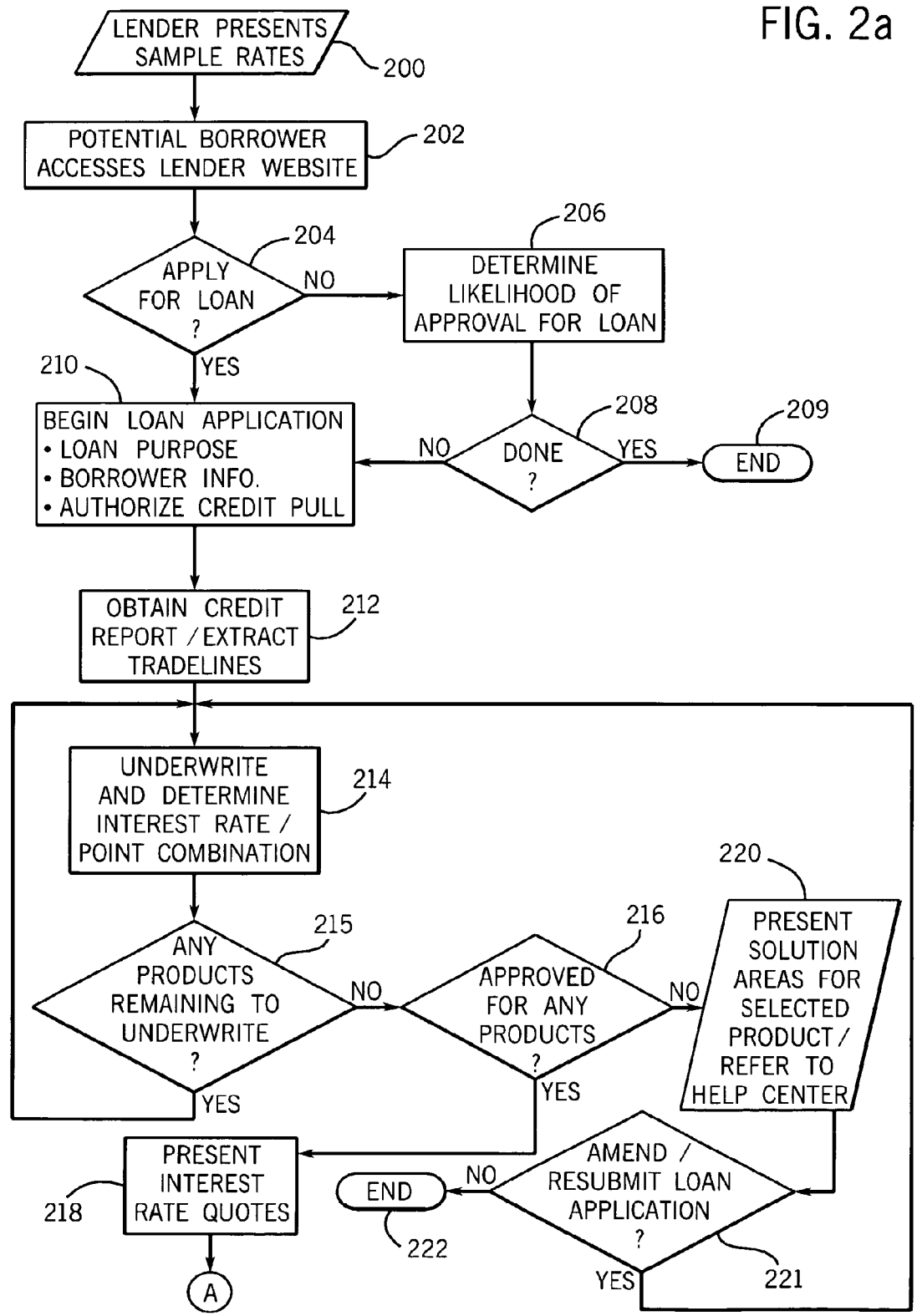
FIGS. 2a and 2b illustrate a method for originating and underwriting loans in accordance with an embodiment.
Figure 2B:
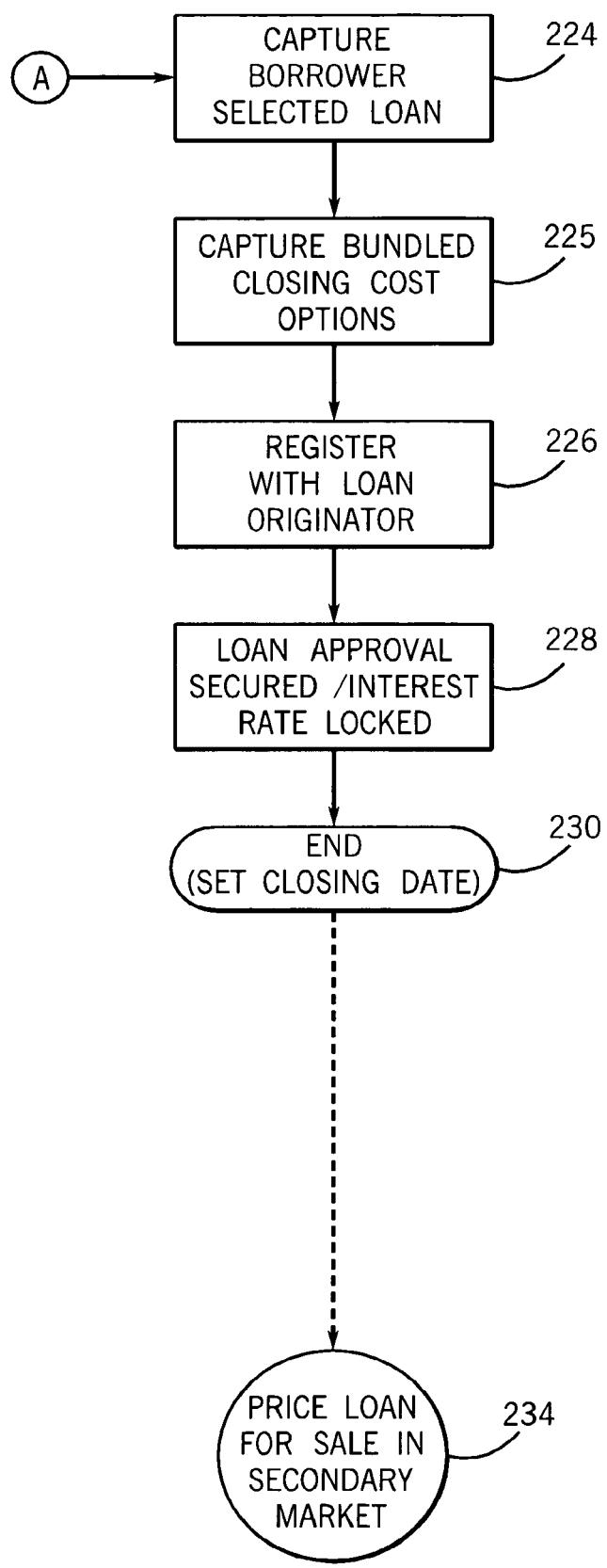

Referring now to FIGS. 2a and 2b, the loan originator (or lender) preferably displays generic interest rates (together with an assumptive rate sheet, i.e., current mortgage rates) on its Internet web site or the like. The generic (or sample) interest rates displayed are not intended to be borrower specific, but are calculated by pricing engine 120 and provided to the loan originator as representative, for example, of interest rates that a typical or hypothetical borrower may expect to receive.

Once the potential borrower has accessed the loan originator's web site (step 202), the potential borrower is given the option of proceeding immediately with an online loan application or first determining his/her likelihood of being approved for a loan (decision 204). If the borrower opts to first ascertain the likelihood of being approved for a loan, system 100 preferably provides the potential borrower with an exploratory, self-assessment tool, such as a probable qualification calculator, that is designed to provide the potential borrower with an anonymous, risk-free and cost-free assessment of the percentage likelihood of approval for a mortgage loan (step 206).

A preferred embodiment of a probable qualification calculator is discussed in further detail in co-pending U.S. patent application Ser. No. 09/593,106, filed Jun. 13, 2000, entitled "Online Mortgage Qualification and Application System and Process," herein incorporated by reference in its entirety. A borrower may submit information that is evaluated (before an actual loan application is submitted) to determine the probability that the potential borrower will be approved for a loan. In addition, it may be determined whether a loan meets the guidelines or requirements of the secondary mortgage market purchaser. A probable qualification calculator may also permit the borrower to compare the probability of approval for different loan scenarios by iteratively selecting different combinations of down payment, sales price, liquid assets, income, loan purpose mortgage product, and so on. Such services can be used without cost to the potential borrower since neither a credit report nor an appraisal is required for the estimation of an approval probability; rather, the borrower need only provide responses to a short online questionnaire which is designed to take only minutes to complete.

Once the potential borrower has ascertained the likelihood of being approved for a loan, the borrower may elect to terminate his/her online loan session and to proceed with an online loan application (decision 208). If the potential borrower does not wish to proceed with a loan application, the session ends (event 209).

If the potential borrower decides to proceed with a loan application, system 100 captures the loan purpose (i.e., purchase or refinance) and other requested information input by the potential borrower including the borrower's and each co-borrower's name and social security number, address, employment, income, assets and current loans (step 210). In a preferred embodiment of the system, up to four (4) co-borrowers may be included on the loan application.

System 100 also assigns a unique identifier or casefile ID for the lender and loan application and requests authorization to obtain a credit report on the borrower. It should be understood that certain of the information for the loan application may be captured automatically from information already entered by the potential borrower in connection with the probable qualification process. This avoids the burden of having the potential borrower enter the same data more than once.

Preferably, system 100 automatically verifies information entered by the potential borrower concerning the address of the real property that is intended to underlie the loan being applied for ("address scrubbing"). System 100 may use known software or systems and methods for address scrubbing. The verified address is preferably used to retrieve the statistical predicted value for available properties which is fed to collateral assessment module 126 during the underwriting process and is used to determine the requisite level of appraisal field work (i.e., waived, exterior-only inspection, or interior and exterior inspection). Also, system 100 preferably obtains the county in which the property is located as well as Metropolitan Statistical Area information for the address ("geocoding"). System 100 may use known software or systems and methods for geocoding. This information may be used to extract Department of Housing and Urban Development (HUD) median income information to help determine if the borrower could be eligible for alternative loan products.

With the permission of the potential borrower received, system 100 obtains a credit report on the borrower (step 212). Preferably, the borrower's real estate tradelines (e.g., outstanding mortgages, home equity loans) are extracted from the credit report and provided to the loan originator. They are also displayed to the potential borrower for review and correction/explanation, if necessary.

With all the requisite credit and other information input, the loan application is submitted for underwriting and to determine an interest rate/point combination (step 214), e.g., the maximum interest rate/point combination the borrower can afford. Generally, underwriting engine 118 determines product eligibility based on preselected/preprogrammed rules. Underwriting engine 118 calls pricing engine 120 for the interest rate and point combinations for each loan product, e.g., the market interest rate and point combinations. A preferred underwriting engine and pricing engine are described in further detail in co-pending U.S. patent application Ser. No. 09/593,106, filed Jun. 13, 2000, entitled "Online Mortgage Qualification and Application System and Process," herein incorporated by reference in its entirety.

If a product is selected by the borrower it is underwritten first. Underwriting engine 118 will also underwrite the borrower for all available loan products (decision 215) and determine those products for which the borrower is approved (decision 216). Underwriting engine 118 provides the loan originator one of three recommendations: (1) "approved" or (2) "refer to help center" or (3) "out of scope" or like message. It should be understood that the underwriting recommendations provided by the secondary mortgage market purchaser through underwriting engine 118 for each loan submitted through system 100 does not constitute an approval or denial of the loan application by the secondary mortgage market purchaser. The response to the loan originator includes all of the approved products and their associated interest rate quotes (e.g., an interest rate and point combination) (step 218). It should be appreciated that this allows the borrower to review all of the information, compare loan products and interest rate quotes (e.g., side-by-side) and select the loan that best fits the borrower's needs (step 224, FIG. 2*b*).

Preferably, during underwriting, underwriting engine 118 also executes a process to determine for each approved product (i) the minimum amount of verification documentation required, (ii) the selected loan underwriting parameters (e.g., maximum loan amount, maximum loan amount for bundling closing costs and minimum refinance amount), and (iii) the maximums and minimums used to tailor the interest rate quote (maximum scheduled interest rate and maximum number of points) and maximum interest rate approved for float up to a preselected increase over a current approved rate.

Additionally, during underwriting, underwriting engine 118 executes collateral assessment module 126 to determine the required level of appraisal field work (i.e., waived, exterior-only property inspection, or interior and exterior property inspection). Preferably, collateral assessment module 126 will also compare the statistical predicted value retrieved earlier in the property management process against the purchase price or estimated value of the underlying real property. The need for an appraisal will be waived if the purchase price or estimated value is accepted.

In the event that the borrower is not approved for any loans, the loan originator is preferably provided with information from underwriting engine 118 identifying problem areas with respect to the borrower's application and suggested areas for improving the borrower's chances for approval (e.g., lower loan amount or reduce debt), and the borrower may be referred to a help center to receive the benefit of such information and suggestions (step 220). Additionally, the HUD median income information provided during the property assessment process may be used to determine if the borrower is eligible for other types of loan products. Also, in the event that no approved products are returned, the borrower is preferably given the opportunity to review, amend and resubmit the loan application (decision 221) prior to the end of the session on system 100 (step 222). If the borrower opts to amend the loan application, the process returns to step 214 and the amended loan application is re-submitted for underwriting and pricing.

Referring now to FIG. 2*b*, with the borrower approved and the selected loan captured by the system 100 (step 224), the options for aggregating lender fees (i.e., the loan originator's actual out-of-pocket fees and expenses and a prorated portion of overhead expenses and reasonable profit associated with loan origination and closing) and closing costs (i.e., all settlement and closing costs and fees including title search/abstract costs, title examination fees, title insurance fees, etc) with the loan principal are captured (step 225). The borrower is then asked to register with the prospect or loan originator (step 226). Registering with the prospect/loan originator provides the borrower with the ability to (i) specify a lock option (e.g., float or lock), (ii) check on loan status (e.g., whether documentation has been received, whether an appraisal has been completed, if required, whether a title search has been completed, and so on). It should be understood that, if the borrower is floating, he/she can request a current "live" rate quote for the selected product at any time.

As mentioned, following underwriting the loan and determining an interest rate/point combination for the loan, the borrower has the ability to rate lock. That is, the borrower can select a product, interest rate/point combination and a rate lock option (i.e., float or lock). If a borrower chooses to float the interest rate, the interest rate may go up or down until the borrower locks an interest rate. While the borrower floats the interest rate, the borrower bears the interest rate risk. Once the interest rate is locked, the lender bears the interest rate risk. A locked rate is fixed at the time the borrower elects or is required by the loan originator to lock. Once loan approval is secured and the interest rate is locked in (step 228), the loan qualification and application process is complete and a closing date is set (step 230).

As loans are approved and locked with borrowers, loan data for each locked loan is stored in database 116 (FIG. 1) and the loans become part of the system pipeline. A loan originator may wish to sell a loan or loans in the system pipeline to a purchaser in the secondary mortgage market after the loan closes. It would be advantageous, however, for the loan originator to be able to value the loan in the secondary market before selling the loan to a purchaser. Accordingly, the system 100 allows the loan originator to send a request to price an individual loan to the pricing engine 120 which calculates a live ("spot") sales price (i.e., the secondary market price that a secondary mortgage market purchaser will pay the loan originator for the individual loan) for delivery to the loan originator (step 234). A preferred method for calculating a "spot" sales price is described in more detail in co-pending U.S. patent application Ser. No. 10/329,634, entitled "Mortgage Loan Valuation, Sale and Funding System and Process," filed Dec. 26, 2002, herein incorporated by reference in its entirety.

A loan originator may initiate a request for a spot sales price for a loan in the system pipeline at any time after the loan has been rate locked. This enables the loan originator to value the individual loan in the secondary market without selling the loan. The loan, however, is not sold until it is closed.

Returning to FIG. 1, if a lender decides to sell the closed loan to a secondary mortgage market purchaser in the secondary market and a forward commitment does not exist, the loan originator initiates a sell loan transaction via pricing engine 120. Upon receiving the request, pricing engine 120 confirms that the loan originator has provided all required underwriting characteristics (e.g., casefile ID, product, and gross interest rate), and calculates the sales price for immediate delivery to the loan originator. This necessitates that pricing engine 120 carry out the additional step of setting the acquisition price equal to the spot price (as calculated above) at the current date (i.e., the date of the acquisition). When a loan (or loans) is sold to the purchaser, a funding process may be initiated using capital engine 132 and funding engine 134 (see FIG. 1). The purchaser may use the capital engine 132 to generate capital for the purchase of a loan by, for example, the sale of debt securities or other financial instruments in the global capital markets. Typically, the purchase of a loan is funded when the loan is acquired by the purchaser. After the funds are generated by the capital engine 132, funding engine 134 is used to provide funds to a seller based on the purchase price when the loan is acquired by the purchaser and also other fees and adjustments.

As mentioned, a loan is not sold (and an acquisition price determined) until the loan has closed. In many instances, there will be a lapse of time from when a loan is rate locked by a borrower to when a loan is closed and sold by a lender/seller. Accordingly, the acquisition price may be different than a spot price obtained by the loan originator when the loan was rate locked. The loan originator (hereinafter referred to as a "seller"), therefore, undertakes the risk that interest rates and the value of the loan in the secondary mortgage market may change between the time a loan is rate locked with a borrower and the time the loan closes and is sold to a purchaser. Specifically, the loan originator undertakes the risk that interest rates will increase thereby reducing the value of the loan (i.e., a loan which is rate locked at a lower interest rate) in the secondary mortgage market or that the borrower will fail to close the loan.

In order to reduce or eliminate the interest rate risk on the part of a seller, purchasers may permit a seller to make a forward commitment to sell the purchaser a specific loan or loans. In a forward commitment, the seller locks in a sales price for the sale of the loan(s) at the time of commitment, but has until a commitment expiration date to deliver the loan(s). A best efforts type of forward commitment requires the lender to deliver a specific loan, with predefined product characteristics, for a predefined par-yield equivalent, by a predefined future date only if the loan closes. A best efforts commitment provides the additional benefit for a seller of reducing or eliminating the fall out risk (or volume risk) associated with loans that do not close within the specified commitment period (i.e., fall out of the system pipeline). As discussed previously, under a best efforts commitment a seller is typically not penalized (e.g., assessed a pair-off fee) for loans that do not close. The seller must only deliver those loans that actually close.

System 100 includes a commitment engine 128 to facilitate entering into a forward commitment, preferably a best efforts type of forward commitment, with the secondary mortgage market purchaser and enables the secondary mortgage market purchaser to manage best efforts commitments made by a seller. Commitment engine 128 is in communication with pricing engine 120 in order to generate prices for the best efforts commitments. In one embodiment, the commitment price is a function of the commitment product, the commitment period and the loan's pass-thru rate. A pass-thru rate may be based on the difference between a gross note rate and a combination of a servicing fee and a credit risk premium. Underwriting engine 118 may assign a loan-level credit risk premium to each loan based on credit risk attributes of each loan. Accordingly, the pass-thru rate is dependent on the credit risk premium for a loan.

Figure 3A:
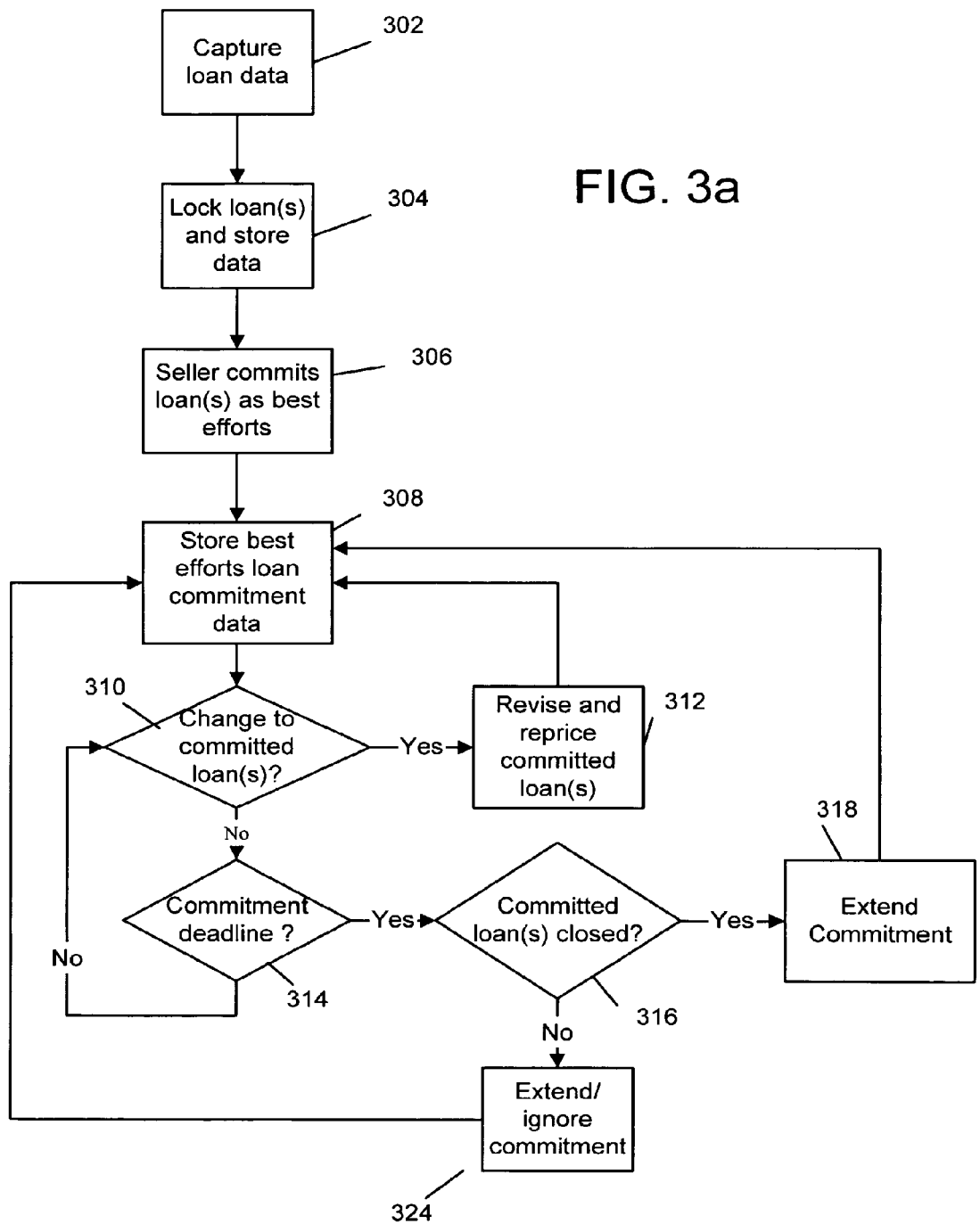
FIG. 3a illustrates a method for managing and pricing a forward commitment in accordance with an embodiment.

FIG. 3*a* illustrates a method of managing and pricing forward commitments in accordance with an embodiment of the invention. At block 302, loan data is captured. As discussed above, loan data may be captured at various points during the operation of system 100 (FIG. 1), such as, the probable qualification calculation, the underwriting process, etc. and may be provided by the potential borrower, the seller (or lender) or the secondary mortgage market purchaser. Once a loan is rate locked with a borrower at block 304, data is stored with the loan's casefile ID and associated loan level data. The loan level data refers to data relating to an individual loan, preferably including such things as casefile ID, borrower name (and other borrower and/or property identification information), locked interest rate, product type, status of the loan, lock expiration date, scheduled closing date, loan purpose, source, loan-to-value ratio, lender identification, number of months of cash reserves of borrower, underwriting criteria (e.g., available assets, credit history, property type, housing and expense ratios, employment status, etc), and so on. As described above, loan level data regarding each loan in the seller's pipeline is stored in database 116 in system 100 and is advantageously accessible to both the seller and purchaser. A seller may wish to commit to sell certain specific loans in the seller's pipeline to a purchaser under a best efforts commitment at block 306.

Figure 4:
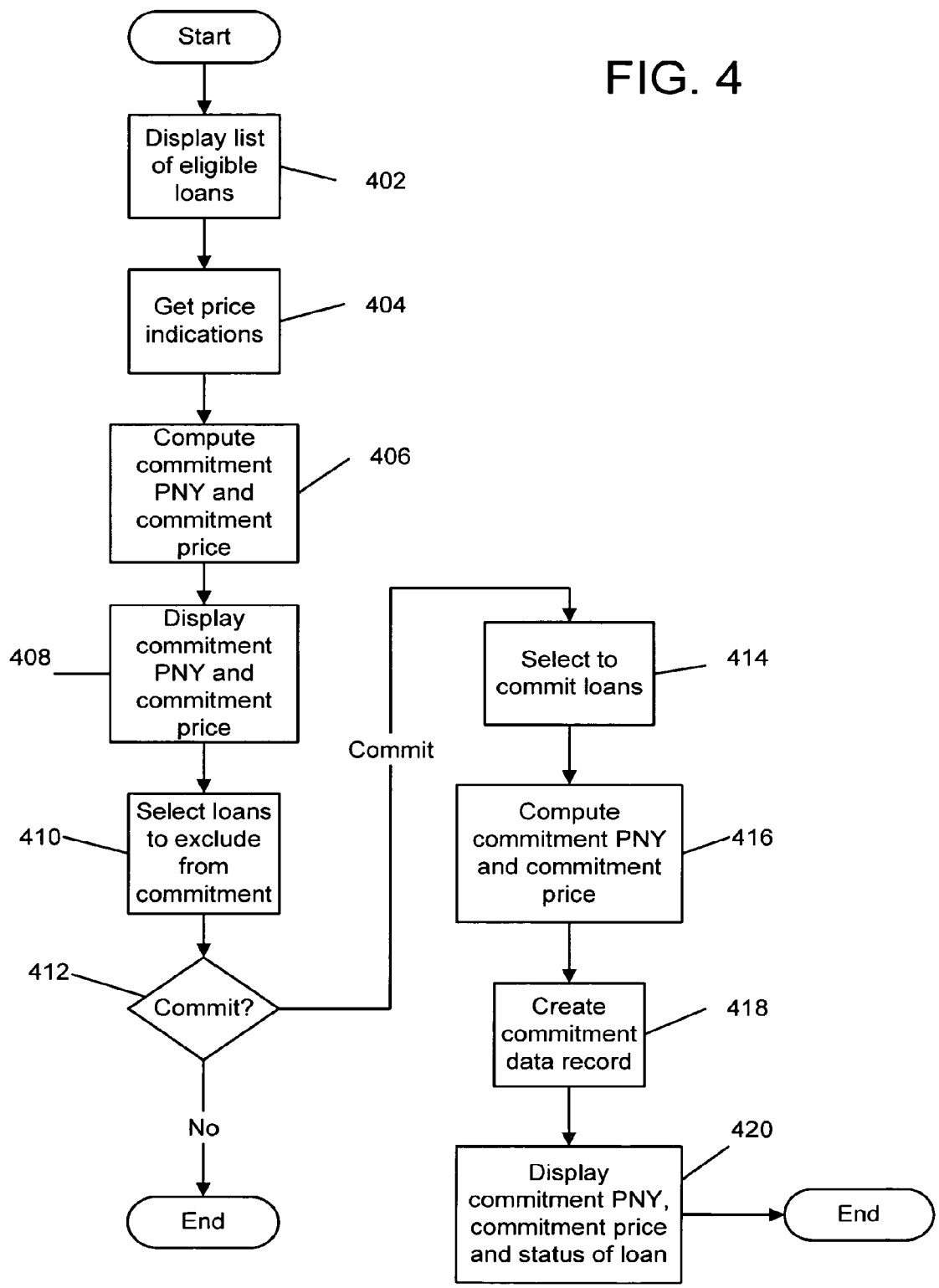
FIG. 4 illustrates a commitment process in accordance with an embodiment.
Figure 5:
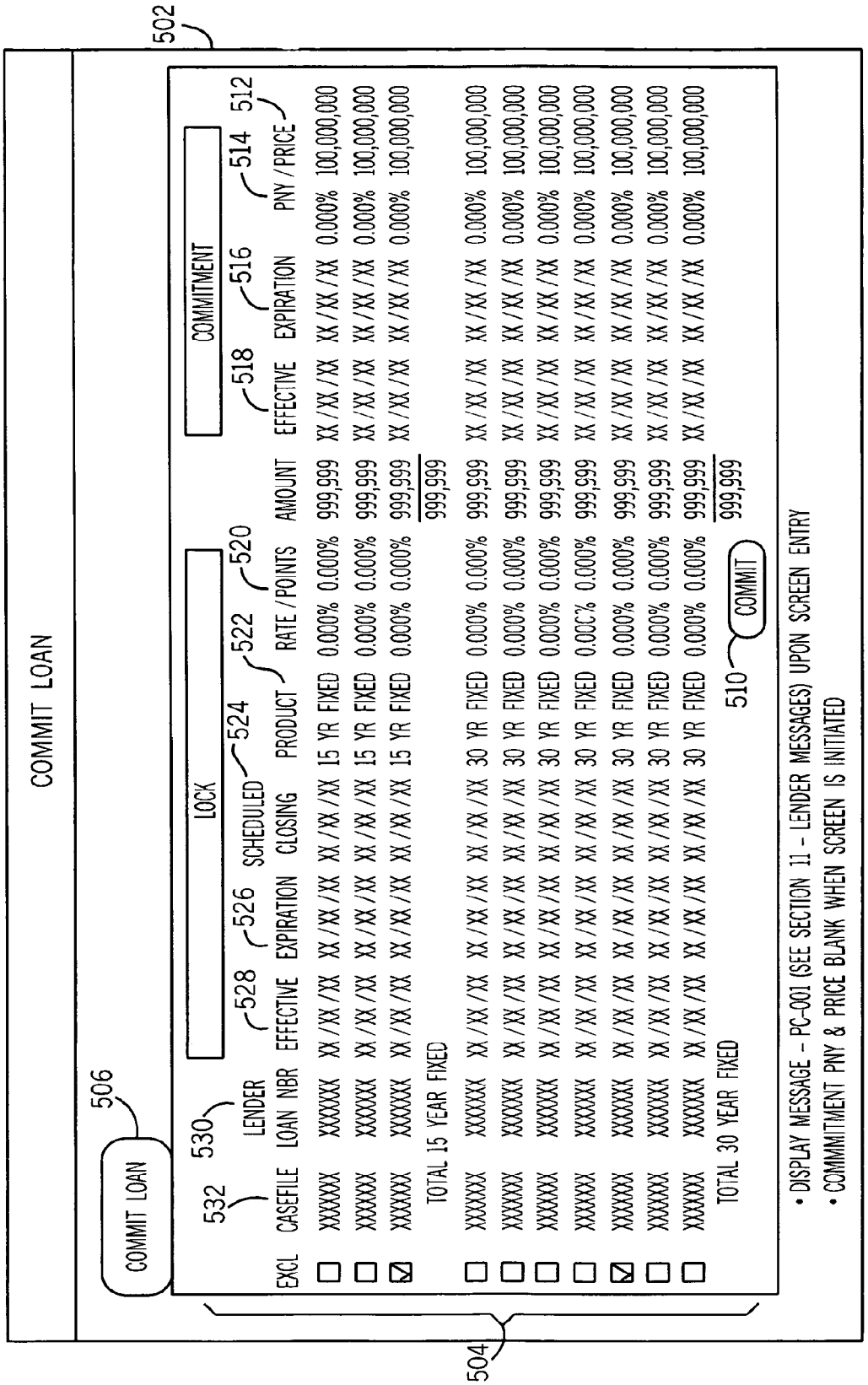
FIG. 5 shows an exemplary user interface for a commitment process in accordance with an embodiment.

FIG. 4 illustrates a commitment process for implementing block 306 in accordance with an embodiment of the invention. When a seller decides to enter into a best efforts commitment, a request is sent at block 402 to the commitment engine 128 (FIG. 1) to identify and display the loans in the system pipeline eligible for a best efforts commitment at block 402. The commitment engine accesses loan level data in the system database 116 (FIG. 1) to determine the locked loans eligible for a best efforts commitment. Many factors may be used to identify the loans in the system pipeline that are eligible, such as: 1) loan rate lock data, e.g., a) the type of product (i.e., is it a loan product eligible for best efforts), b) the type of lock, and c) the effective date of the lock; 2) loan sale status (i.e., the loan should not have a status of sold or funded); 3) the scheduled closing date (i.e., the scheduled closing date should be in the future); and 4) there should be no actual closing date (i.e., the loan should not be closed). Eligible loans identified by the commitment engine are displayed to the seller at block 402 with a price indication for each of the selected loans. System 100 advantageously allows a seller to value a loan (e.g., get a price indication) as a best efforts commitment before actually executing the commitment of the loan to the purchaser. FIG. 5 shows an exemplary display 502 showing a list 504 of loans eligible for a best efforts commitment.

Returning to FIG. 4, at block 404 a request is sent from the commitment engine 128 (FIG. 1) to the pricing engine 120 (FIG. 1) to calculate a best efforts commitment price indication for each loan. The commitment price for each loan is calculated using a forward pricing algorithm at block 406. The pricing engine 120 calculates a price adjustment for managing fall out risk and the interest rate risk (i.e., the risk of fluctuating prices). Pricing engine 120 has access to loan level data for the individual loan being priced for sale under a best efforts commitment. Pricing engine 120 also has access to historic data for a specific lender including price adjustments derived from historic data regarding the pipeline fallout for the specific lender through system 100, allowing the price adjustment for fall out risk to be calculated based on lender-specific data. The price for a loan submitted as a best efforts commitment will typically be less than the price for a loan submitted as a mandatory commitment because with a best efforts commitment, the purchaser has taken on the fall out risk in addition to the interest rate risk (e.g., the lender does not have to pay a pair off fee in the event that the loan is not delivered).

The pricing engine 120 calculates a commitment yield and a commitment price for each loan submitted. In addition, commitment engine 128 determines a commitment effective date and a commitment expiration date. Preferably, the pricing engine 120 uses loan level data and commitment data available through system 100 to provide an accurate price. Various types of data such as loan level data (as described above), seller information (including historic information and adjustments derived from historic information regarding performance of a specific seller's loan pipeline) and purchaser information is stored in the system database and is available to the pricing engine. For example, in one embodiment, the pricing algorithm may include as inputs: 1) loan level data for the specific loan being priced (e.g., the type of loan product, the lock expiration date, the scheduled closing date, credit risk pricing, status of the loan, purpose of the loan (e.g., refinance or purchase), the loan to value ratio (LTV), source of the loan, underwriting criteria, etc.), 2) data regarding the seller of the specific loan (e.g., close-to-sale lapse period, seller default servicing fee, etc.), 3) purchaser pricing information (e.g., a purchaser hedge factor based on, for example, the seller and the committed product), and 4) current interest rate pricing from Wall Street and/or the purchaser.

As mentioned, the pricing engine calculates a commitment yield and a commitment price for each loan submitted for a price indication. These values are displayed to the seller at block 408. The price indication process allows a seller to value each loan for sale as a best efforts commitment before making a commitment to the purchaser. As discussed below, the best efforts price the seller will receive is recalculated when the loans are committed.

At block 410, the seller may select the loans to exclude from the best efforts commitment. In other words, the seller selects the loans which the seller wishes to sell to the purchaser under a best efforts commitment. Once the seller has indicated the individual loans to commit under a best efforts commitment, the seller may either elect to execute the commitment or quit (decision 412).

If the lender selects to commit the selected loans, at block 414, a request will be sent from the commitment engine 128 (FIG. 1) to the pricing engine 120 (FIG. 1) to calculate the commitment yield and commitment price for each loan submitted for commitment. The pricing engine 120 calculates the best efforts price as described above. The price for the best efforts commitment (or any forward commitment) is only valid for a predefined period of time (i.e., the commitment period). Commitment engine 128 provides pricing engine 120 with a commitment expiration date that defines the end point of the commitment period for a particular loan. The committed price is honored as long as the delivered loan (i.e., a closed loan) matches the commitment terms and is acquired by the purchaser on or before the commitment expiration date.

Once the commitment yield and commitment price are calculated at block 416, a commitment data record is created at block 418 for each loan. The commitment data records may be stored in the system database 116 (FIG. 1) and include information such as casefile ID, loan lock data (e.g., lock effective date, lock expiration date, scheduled closing date, type of product, locked interest rate and points for the loan) and commitment data (e.g., commitment effective date, commitment expiration date, commitment yield and commitment price). At block 420, the commitment yield, the commitment price and the status of each loan committed are displayed to the seller.

FIG. 5 shows an exemplary user interface 502 for a commitment process in accordance with an embodiment of the invention. FIG. 5 includes a list 504 of loans eligible for a best efforts commitment as identified by the commitment engine, as described above. A tab or link "commit loan" 506 may be used by a user (e.g., a seller) to submit a request to view the display of eligible loans. If a seller wishes to commit certain loans, the seller selects the specific loans to exclude and selects the "Commit" link 510 to send a request to commit and price the selected loans. After a commit request, the display 502 is updated and provides for each listed loan information such as casefile ID 532, seller loan ID 530, lock effective date 528, lock expiration date 526, scheduled closing date 524, product type 522, locked interest rate and points 520, commitment effective date 518, commitment expiration date 516, commitment yield 514 and commitment price 512.

Returning to FIG. 3a, once a loan has been committed at block 306, the loan commitment data is stored in a database at block 308. System 100 continues to track the status of each loan committed and identifies when a change has been made to a committed loan at block 310. If a change has been made to a committed loan (e.g., by the seller), the commitment may be revised and repriced at block 312 based on the change. In this manner, system 100 advantageously enables a seller and lender to take steps to prevent committed loans from "falling-out" (e.g., by not closing before the commitment expiration date) of the system pipeline due to a change made after the loan has been locked and committed. If a seller changes or updates the characteristics of a committed loan, an extension of the commitment expiration date or a commitment product change may be required to prevent the committed loan from falling out of the pipeline. A commitment extension may also be necessary as part of a commitment product change (e.g., when a product is changed, the scheduled closing date or lock expiration date may be changed and an extension of the commitment expiration date may be necessary). These features assist a purchaser with managing the volume (or fall out) risk associated with a best efforts commitment and assist the seller with making sure that active commitments are not unintentionally allowed to fall out.

Figure 6:
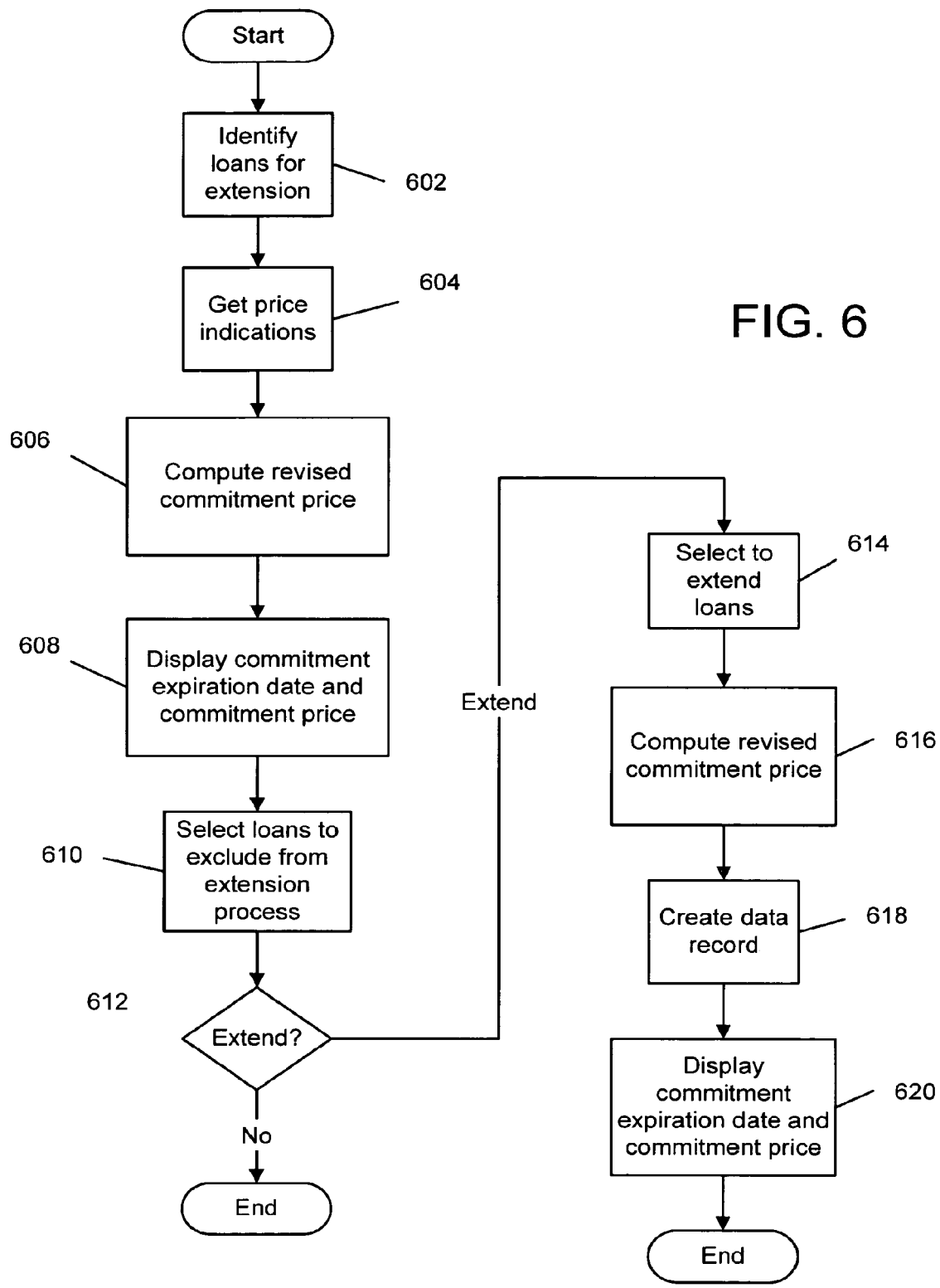
FIG. 6 illustrates an extension process in accordance with an embodiment.

FIG. 6 illustrates an extension process in accordance with an embodiment of the invention. An extension of the commitment expiration date may be required if the seller updates either a) the scheduled closing date for a committed loan (i.e., the scheduled closing date plus the seller's close-to-sale lapse period exceeds the commitment expiration date), or b) the actual closing date of the committed loan to a date that does not allow sufficient time for the closed loan to be acquired by the purchaser (i.e., the closing date plus the seller's close-to-sale lapse period exceeds the existing commitment expiration date). Any changes or updates to a committed loan are entered into the lender system 101 (FIG. 1) by a seller and stored in database 116. Accordingly, the server 110, processor 112 and the associated software may identify when a characteristic of a committed loan has been updated and determine whether the update will, for example, require an extension of the commitment expiration date.

At block 602, the system identifies committed loans that require an extension. If a seller extends the scheduled closing date for a loan that has already been committed to the purchaser under a best efforts commitment, the commitment engine will check to see if the updated scheduled closing date plus the seller's close-to-sale lapse period will exceed the existing best efforts commitment expiration date. If the commitment expiration date will be exceeded, the committed loan is identified as a loan that needs an extension. In a similar manner, if a seller enters an actual closing date for a loan that has been committed to the purchaser under a best efforts commitment, the commitment engine will check to see if the actual closing date plus the seller's close to sale lapse period exceeds the existing best efforts commitment date. If the commitment expiration date will be exceeded, the committed loan is identified as a loan that needs an extension.

The loans that require an extension are displayed to the seller. At block 604, a price for the extension is obtained before actually executing the extension of the loan. An extension of the commitment expiration date will typically require a price adjustment (e.g., an extension fee). At block 606, a request is sent to the pricing engine 120 to recalculate the commitment price using an extension pricing algorithm. The pricing engine 120 will calculate a new commitment expiration date and commitment price. The revised commitment price and commitment expiration date are then displayed to the seller at block 608.

The seller may then select the loans to be extended at block 610. At block 612, the seller may elect to perform an extension for each of the selected loans or to quit. If the seller elects to extend the selected loans at block 614, a request is sent to the pricing engine to recalculate the pricing of the commitment using an extension pricing algorithm at block 616. As mentioned, an extension of the commitment expiration date will typically result in a price adjustment (e.g., an extension fee). The data record for the extended commitment is updated at block 618 with the revised commitment expiration date and commitment price. In addition, the revised commitment expiration date and commitment price are displayed to the seller at block 620.

FIG. 7a shows an exemplary user interface 702 displaying a list 704 of committed loans that have been identified as needing an extension. Loan data (e.g., casefile ID, scheduled closing date, etc.) and commitment data (e.g. commitment expiration date, commitment price, etc.) are displayed for each loan. A seller may select loans to exclude from the extension process. If the seller wishes to extend each loan commitment, the seller may select the "Extend Commitment" link 708. Again, the interface 702 will be updated with the revised commitment data including the revised commitment price.

Figure 7B:
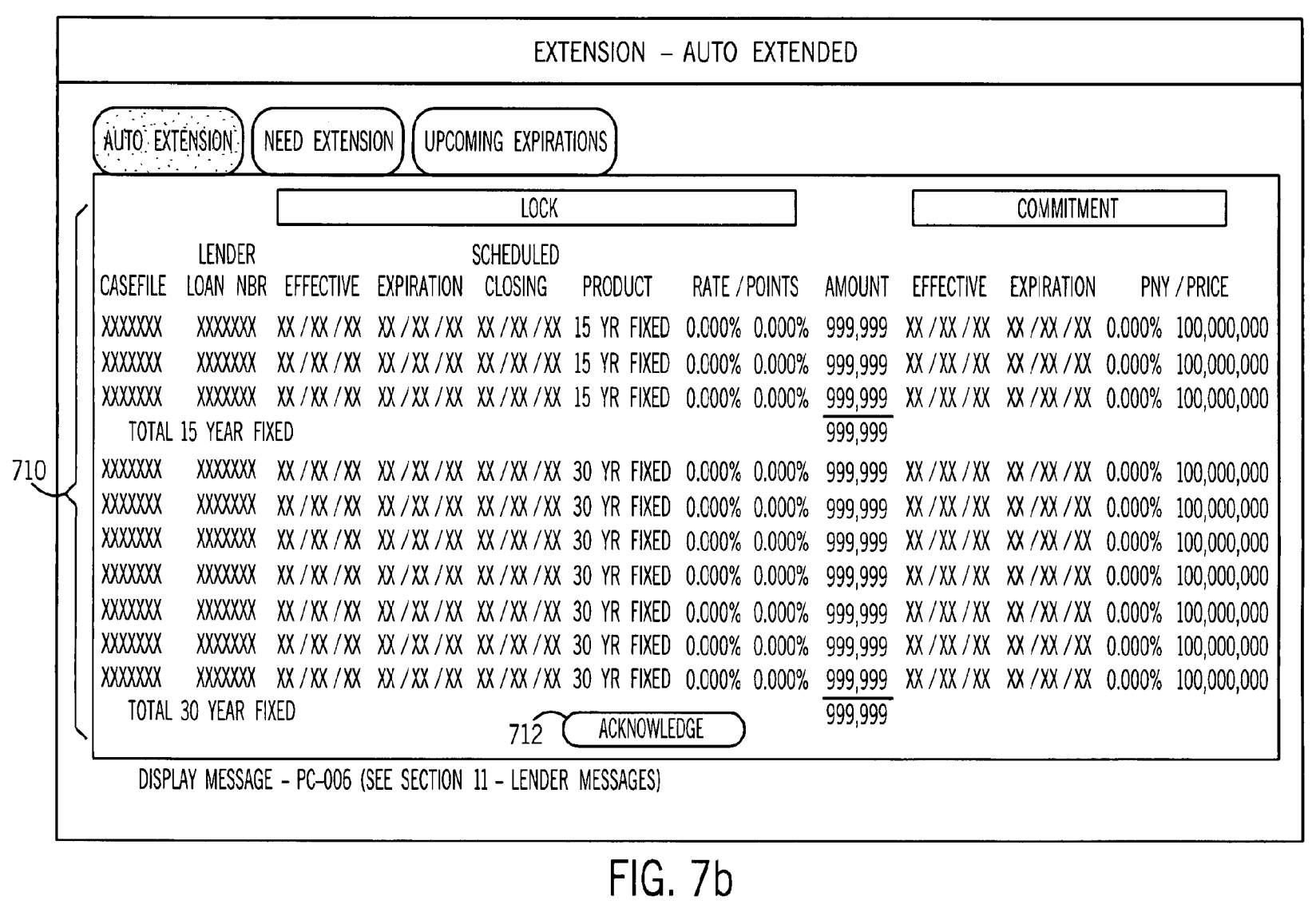

In one embodiment, loans that have been identified as needing an extension of the commitment expiration date may be automatically extended by the system if the seller does not extend the commitment within a predefined time period (e.g., one business day). This is possible because, as discussed previously, server 110 and processor 112 have access to knowledge regarding the pipeline for a specific lender. Any changes to committed loans are entered into the lender system 101 and stored in database 116, where the changes are available to the server 110 and its associated software. A new commitment expiration date and commitment price are calculated by the pricing engine for the loan and automatically recorded as the new commitment data to the particular loan. The new commitment data is stored in the data record for the loan. FIG. 7b shows an exemplary user interface displaying loan commitments that have been automatically extended. A seller may view a list 710 of the "Auto Extended" committed loans. Preferably, the seller will acknowledge the extension to the committed loans by selecting the "Acknowledge" link 712. This acknowledgement by the lender must be performed before the closed loan may be subsequently acquired by the purchaser.

In another embodiment, a seller may also view loan commitments which will expire (i.e., the commitment expiration date is approaching) within a predetermined upcoming time period (e.g., the next five business days). FIG. 7c shows an exemplary display of loan commitments which will expire. A list 714 of loan commitments and the associated loan lock data 716 and commitment data 718 are displayed. In this manner, a seller may monitor and identify loan commitments for which the commitment expiration date is approaching.

Figure 8:
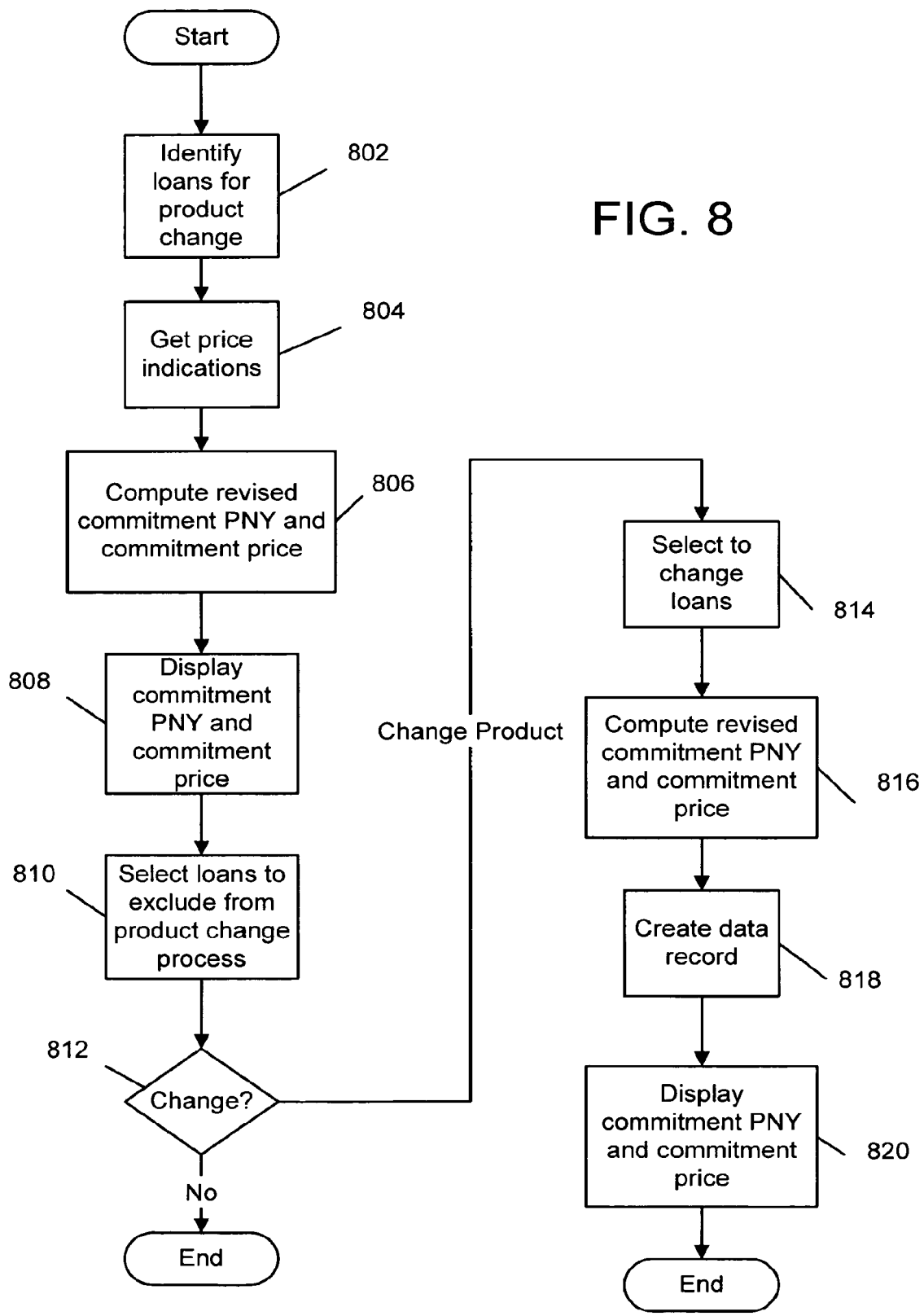
FIG. 8 illustrates am eligible product change process in accordance with an embodiment.
Figure 9:
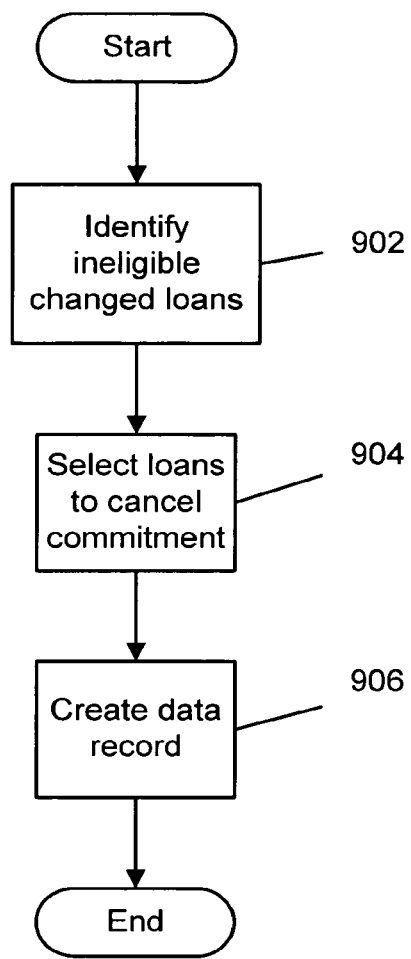
FIG. 9 illustrates an ineligible product change process in accordance with an embodiment.

As discussed above, if a seller changes or updates the characteristics of a loan, a commitment product change may be required to prevent the committed loan from falling out of the pipeline. FIGS. 8 and 9 illustrate a product change process in accordance with an embodiment of the invention. A seller may change or update the characteristics of a locked loan product that has been committed to the purchaser. Any changes or updates to a committed loan are entered by a seller into the lender system 101 (FIG. 1) and stored in database 116. Server 110 also receives this information due to the integration of the lender system 101 and server 110. As discussed previously, this integration provides a purchaser or other secondary mortgage market participant with pipeline knowledge. The change or update may affect whether the loan product is eligible for a best efforts commitment and/or the commitment price.

Referring to FIG. 8, at block 802, the commitment engine identifies committed loans that may require a commitment product change and updated price. When a seller enters a change to a loan product committed to the purchaser, the commitment engine 128 will check to determine if the revised locked loan product is an eligible best efforts product. If the revised locked loan is an eligible best efforts product, the process continues as shown in FIG. 8. If the revised locked loan product is an ineligible best efforts product, the process continues as shown in FIG. 9.

Referring to FIG. 8, revised locked loan products that are eligible best efforts products are identified at block 802. A change to the loan product may require a price adjustment of the commitment price. A price indication is computed at block 804 by sending a request to the pricing engine 120 at block 806 to recalculate the commitment yield and commitment price using a product change pricing algorithm. The pricing engine will recompute the commitment yield and the commitment price based on the new characteristics of the revised locked loan. The revised commitment yield and commitment price are then displayed to the seller at block 808.

Once the eligible revised loans have been identified, the seller may select loans to exclude from a commitment product change at block 810. At block 812, the seller may execute the commitment product change or quit. If the seller elects to perform a commitment product change for the selected loans at block 814, a request is sent to the pricing engine 120 to recalculate the pricing of the commitment using a product change pricing algorithm at block 816. As mentioned, a change to the locked loan product may result in a price adjustment of the commitment price. The commitment data record for the commitment with the product change is updated at block 818 with the revised commitment product, commitment yield and commitment price. In addition, the revised commitment product, commitment yield and commitment price are displayed to the seller at block 820.

FIG. 10*a* shows an exemplary user interface for eligible product changes in accordance with an embodiment of the invention. A display 1002 shows a list 1004 of loan commitments where the locked loan product was changed by the seller and resulted in an eligible best efforts commitment product. For each loan commitment, the loan lock data 1006 and the current commitment data 1008 is shown. In addition, the new commitment data 1010 for the commitment product change is displayed along with the price indication information for the new commitment. If the seller wishes to perform a commitment product change for each selected loan, the seller may select the "Perform Product Change" link 1014. The display 1002 will be updated with the new commitment data 1010.

In one embodiment, loans that have been identified as needing a commitment product change may be automatically updated by the system if the seller does not perform the commitment product change within a predefined time period (e.g., one business day). A new commitment yield and commitment price are calculated by the pricing engine for the loan and automatically applied to the particular loan. FIG. 10*b* shows an exemplary user interface displaying loan commitments that have been automatically changed. A seller may view a list 1016 of the "Auto Changed" committed loans. Preferably, the seller will acknowledge the change to the committed loans by selecting the "Acknowledge" link 1018. This acknowledgement by the lender/seller must be performed before the closed loan may be subsequently acquired (or funded) by the purchaser.

FIG. 9 illustrates a commitment product change process for a revised locked loan product that is an ineligible best efforts product. At block 902, the commitment engine identifies the revised locked loan products that are ineligible best efforts commitment products. The seller may select to cancel the ineligible loan commitments at block 904. The cancelled loan will be considered as fallout from the system pipeline. At block 906, the commitment data record is updated to indicate that the loan commitment has been cancelled.

Figure 10C:
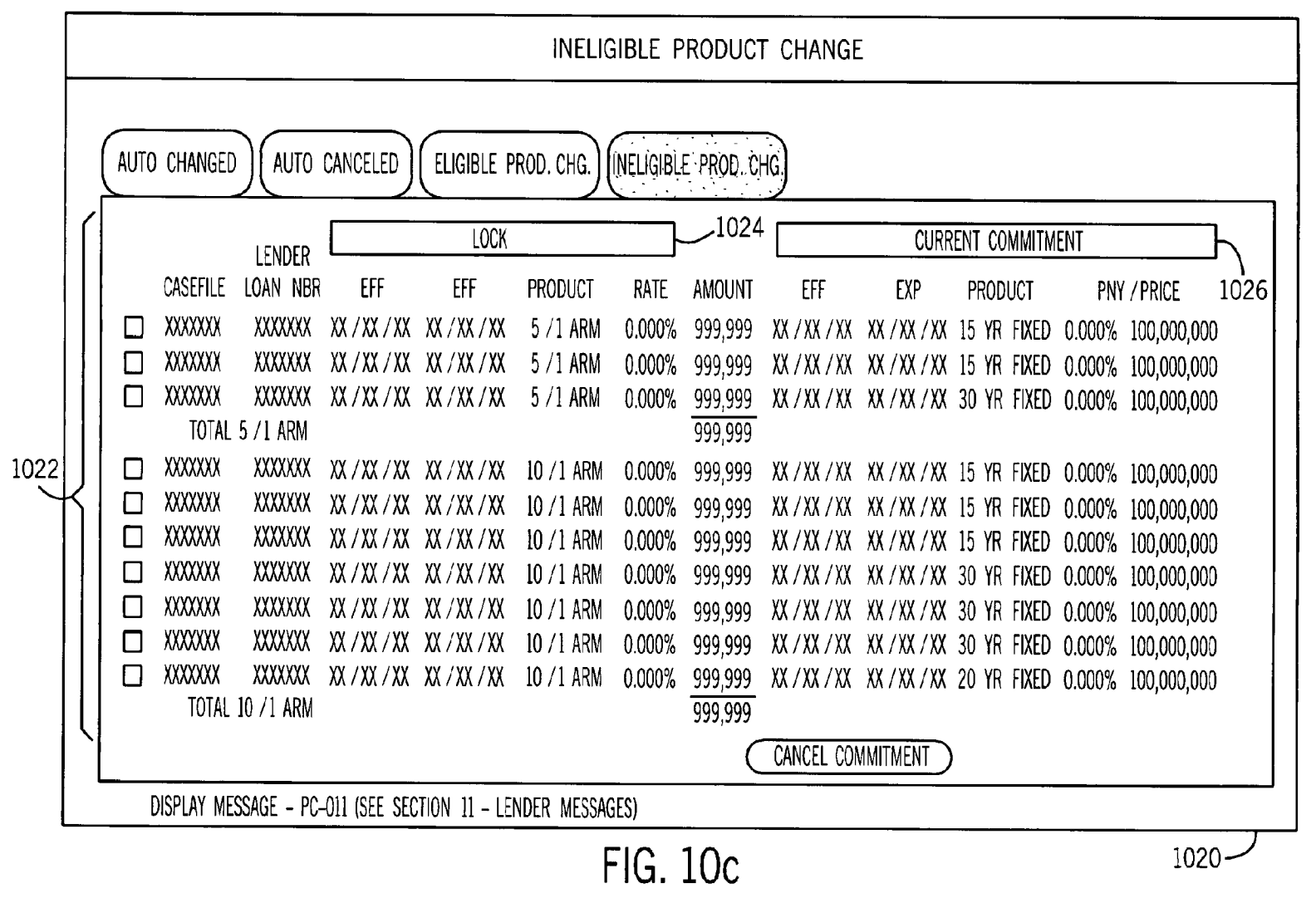

FIG. 10*c* shows an exemplary user interface for ineligible product changes in accordance with an embodiment of the invention. A display 1020 shows a list 1022 of loan commitments where the locked loan product was changed by the seller to an ineligible best efforts commitment product. For each loan commitment, the loan lock data 1024 and the current commitment data 1026 is shown. A seller may cancel selected loans by selecting the "Cancel Commitment" link 1028. Cancelled loan commitments will be considered as fallout from the system pipeline.

In one embodiment, loans that have been identified as ineligible best efforts commitment products may be automatically canceled by the system if the seller does not cancel the commitment within a predefined time period (e.g., one business day). Cancelled loan commitments will be considered as fallout from the system pipeline. FIG. 10*d* shows an exemplary user interface displaying loan commitments that have been automatically cancelled. A seller may view a list 1030 of the "Auto Canceled" committed loans. Preferably, the seller will acknowledge the canceled committed loans by selecting the "Acknowledge" link 1032. As mentioned, cancelled loan commitments will be considered as fallout from the system pipeline.

Returning to FIG. 3*a*, once a commitment has been revised and repriced at block 312 due to a change made to the commitment by the seller, the new commitment data for the loan commitment is stored in the system database at block 308. If no change has been made to a committed loan at block 310, the commitment engine determines whether the commitment deadline has been reached at block 314. If the commitment deadline has not been reached, the process returns to block 310 and the system continues to monitor the status of the committed loans. It should be understood that a committed loan may be delivered for acquisition by the purchaser before the commitment expiration date if the loan has closed.

If the commitment deadline has been reached at block 314, the commitment engine determines whether the committed loan(s) have closed at block 316. If the committed loan has not closed, the commitment should be extended or allowed to expire at block 324. The data record for the commitment will be updated if the commitment expiration date was extended as described above. If the commitment expiration date is extended, a request is sent to the pricing engine to recalculate a commitment price based on the new commitment expiration date. The updated pricing information will also be stored in the data record for the loan commitment.

If the committed loan has closed at block 316, the commitment may be extended automatically for a pre-defined period of time (e.g., five calendar days) at block 318. The data record for the commitment will then be updated with the revised commitment expiration date and commitment price at block 308.

Figure 3B:
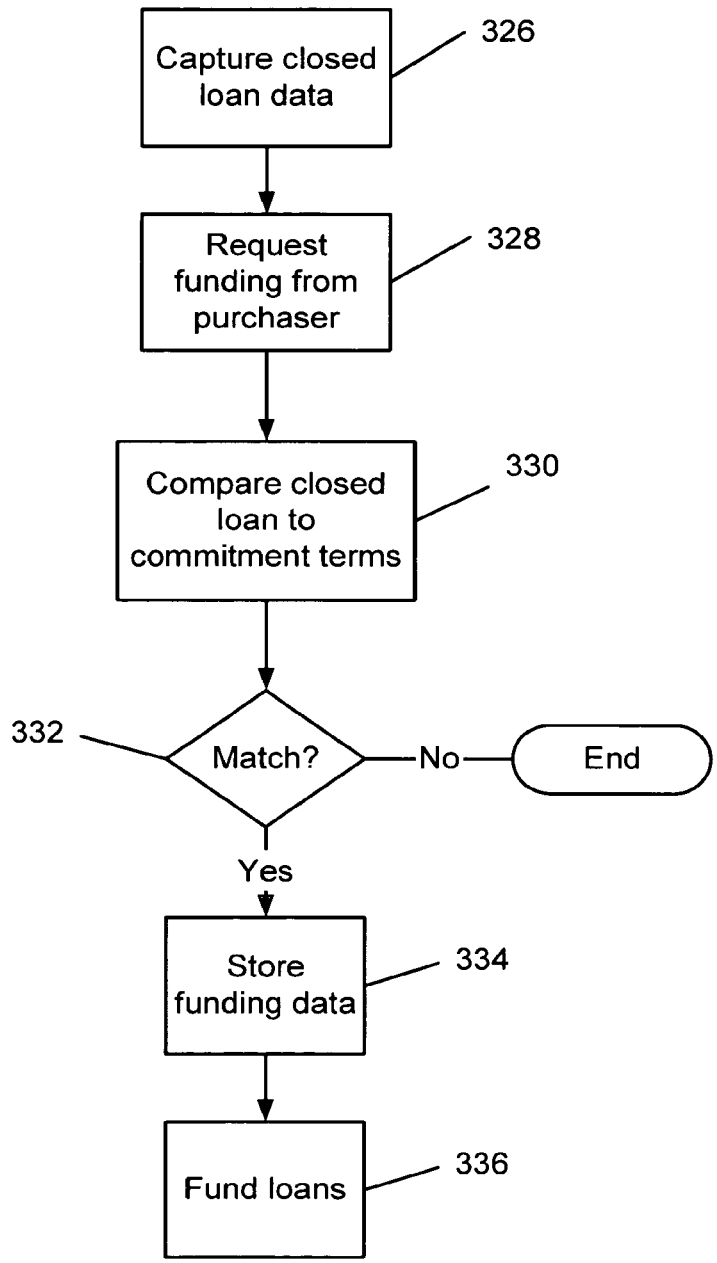
FIG. 3b illustrates a method for funding loans of a forward commitment in accordance with an embodiment.

Referring to FIG. 3b, if the committed loan has closed, the seller submits the closed loan data at block 326. A request for funding by the purchaser is submitted at block 328. The closed loan is compared to the commitment record to determine if the closed loan matches the commitment terms at block 330. As discussed previously, the commitment price is honored as long as the delivered loan matches the commitment terms and is ready for acquisition by the purchaser on or before the commitment expiration date. If the closed loan does not match the commitment terms (decision 332), a price adjustment may be required and the funding process ends. If the closed loan does match the commitment terms, a data record is created for the closed loan at block 334. At block 336, a loan funding process is initiated to provide the funds to the seller and transfer ownership of the loan upon acquisition of the loan by the purchaser. A capital engine 132 and funding engine 134 as shown in FIG. 1 may be used to perform the loan funding process. A preferred loan funding process is discussed in detail in co-pending U.S. patent application Ser. No. 10/329,634, entitled "Mortgage Loan Valuation, Sale and Funding System and Process," filed Dec. 26, 2002, herein incorporated by reference in its entirety.

In one exemplary embodiment, a capital engine 132 (FIG. 1) is used to facilitate generation of capital to fund the purchase of loans under best efforts commitments made by a seller. The purchaser may use the capital engine 132 to generate capital for the purchase of a loan by, for example, the sale of debt securities or other financial instruments in the global capital markets. The capital engine 132 preferably includes software tools which, in response to user inputs, structures and creates such financial instruments and manages the risk (e.g., interest rate risk, credit risk, prepayment risk) associated with such instruments.

A seller may commit to sell numerous individual loans under a best efforts commitment. As discussed above, a best efforts commitment shifts the interest rate (or price) risk and the volume (or fall out) risk to the purchaser. Accordingly, the purchaser generates a price to purchase a loan under a best efforts commitment that takes into consideration these risks. In addition, it is desirable for the purchaser to generate capital for the purchase of these loans in a manner that manages the risk that all of the individual loans committed by a seller as best efforts will close and be delivered.

In order to assist in the management of the volume (or fall out) risk associated with best efforts commitments, capital engine 132 may use the information available through the integrated system 100 to generate an appropriate coverage ratio for the generated capital. In particular, capital engine advantageously has access to historic information regarding the past performance of a particular sellers pipeline as well as loan level data including the status of individual loans currently in the pipeline. This information may be used by the capital engine 132 to estimate how much of the loans committed as best efforts by a particular seller will actually close and be delivered. Capital engine 132 will generate a coverage ratio that is used to determine the amount of capital that should be generated. The generated capital will be available to purchase individual loans when each loan actually closes and is delivered to the purchaser. Funding engine 134 may be used to provide funds to a seller based on the purchase price when the loan is acquired by the purchaser and also other fees and adjustments. In addition, ownership of the loan is transferred from the seller to the purchaser.

Many other changes and modifications may be made to the present invention without departing from the spirit thereof. The scope of these and other changes will be come apparent from the appended claims.

What is claimed is:

1. A system for loan acquisition by an investor, the system comprising:
    data capture logic configured to receive loan level data for a loan from a lender;
    a storage device coupled to the data capture logic for storing at least the loan level data;
    commitment logic coupled to the data capture logic, the commitment logic configured to create a forward commitment for the sale of the loan based on a request received from the lender, the forward commitment having commitment data; and
    pricing logic coupled to the commitment logic, the pricing logic configured to determine a price for the forward commitment based on at least the loan level data;
    wherein the commitment logic is further configured to identify a change made to the loan level data by the lender, and to update the loan level data and the commitment data based on the change, and the pricing logic is further configured to determine an updated price for the forward commitment based at least on the change to the loan level data.

2. A system according to claim 1, wherein the loan data includes a loan identifier, a lender identifier, a loan product type, an interest rate, loan purpose, loan-to-value ratio, loan status, lock expiration date, credit risk information, source, underwriting criteria and a scheduled closing date.

3. A system according to claim 1, wherein the commitment data includes a commitment effective date, a commitment product, a commitment expiration date and a commitment price.

4. A system according to claim 1, wherein upon identifying a change to the loan level data, the commitment logic generates an extension of a commitment period for the best efforts commitment.

5. A system according to claim 1, wherein upon identifying a change to the loan level data, the commitment logic generates a revised commitment product and an associated price change.

6. A system according to claim 1, wherein upon identifying a change to the loan level data, the commitment logic determines whether the change to the loan level data results in an ineligible forward commitment loan product.

7. A system according to claim 1, wherein updating the commitment data includes calculating a commitment expiration date.

8. A system according to claim 1, wherein the commitment price includes a commitment yield value.

9. A system according to claim 1, wherein the loan is a mortgage loan.

* * * * *